United States Patent [19]

Mori et al.

[11] 4,138,529
[45] Feb. 6, 1979

[54] PHOSPHORS AND X-RAY IMAGE CONVERTERS USING THE SAME

[75] Inventors: Etsuo Mori, Odawara; Keiji Shimiya, Hiratsuka; Norio Miura, Isehara; Yujiro Suzuki, Odawara, all of Japan

[73] Assignee: Dai Nippon Toryo Co., Ltd., Osaka, Japan

[21] Appl. No.: 807,177

[22] Filed: Jun. 16, 1977

[30] Foreign Application Priority Data

Jun. 25, 1976 [JP] Japan .................. 51-75267
Jun. 25, 1976 [JP] Japan .................. 51-75268
Jun. 25, 1976 [JP] Japan .................. 51-75270
Oct. 8, 1976 [JP] Japan .................. 51-120895
Oct. 8, 1976 [JP] Japan .................. 51-120896
Oct. 14, 1976 [JP] Japan .................. 51-123288

[51] Int. Cl.² ........................ C09K 11/46
[52] U.S. Cl. ................. 428/539; 252/301.4 H; 252/301.4 S; 250/483
[58] Field of Search .......... 252/301.4 H, 301.4 S; 428/539; 250/483

[56] References Cited

U.S. PATENT DOCUMENTS

| 2,303,963 | 12/1942 | Uhle .................. 252/301.4 H |
| 3,778,615 | 12/1973 | Luckey ............... 252/301.45 X |
| 3,988,252 | 10/1976 | Ferretti .............. 252/301.4 H |
| 4,057,508 | 11/1977 | Wolfe et al. ......... 252/301.4 H |

Primary Examiner—Jack Cooper
Attorney, Agent, or Firm—Gerald J. Ferguson, Jr.; Joseph J. Baker

[57] ABSTRACT

A complex halide phosphor represented by the following composition formula and an X-ray image converter using the same:

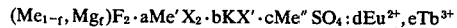

$$(Me_{1-f}, Mg_f)F_2 \cdot aMe'X_2 \cdot bKX' \cdot cMe''SO_4 : dEu^{2+}, eTb^{3+}$$

wherein Me, Me' and Me" each represents at least one of the alkaline earth metals of the group consisting of barium, strontium and calcium; X and X' each represents at least one of chlorine and bromine; and a, b, c, d, e and f are numbers defined by one of the following five combinations:

1. $0.80 \leq a_1 \leq 1.50$, $0.10 \leq b_1 \leq 1.50$, $c_1 = 0$, $0.001 \leq d_1 \leq 0.20$, $e_1 = 0$ and $f_1 = 0$.
2. $0.30 \leq a_2 \leq 1.50$, $0.10 \leq b_2 \leq 2.00$, $0.01 \leq c_2 \leq 1.00$, $0.001 \leq d_2 \leq 0.20$, $e_2 = 0$ and $f_2 = 0$.
3. $a_3 = 1$, $b_3 = 0$, $c_3 = 0$, $0.01 \leq d_3 \leq 0.10$, $0 < e_3 \leq 0.05$ and $f_3 = 0$.
4. $a_4 = 1$, $b_4 = 0$, $c_4 = 0$, $0.001 \leq d_4 \leq 0.20$, $e_4 = 0$ and $0 < f_4 \leq 1$.
5. $a_5 = 1$, $0 < b_5 \leq 1.5$, $c_5 = 0$, $0.001 \leq d_5 \leq 0.20$, $e_5 = 0$ and $0 < f_5 \leq 1$.

8 Claims, 14 Drawing Figures

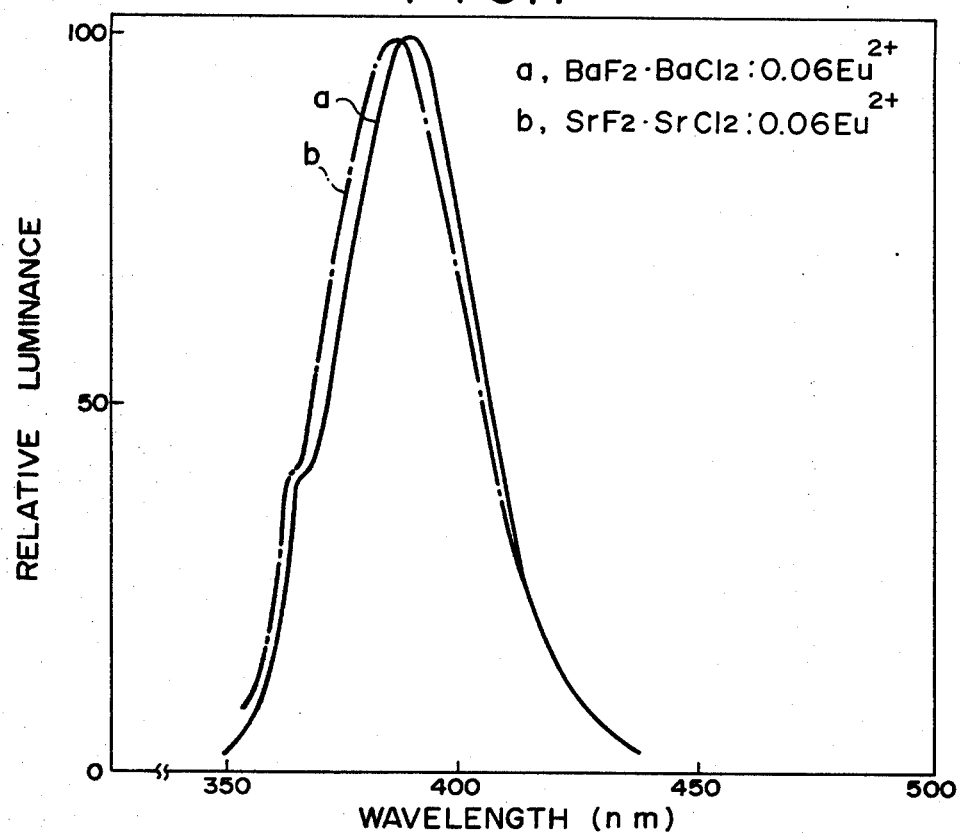
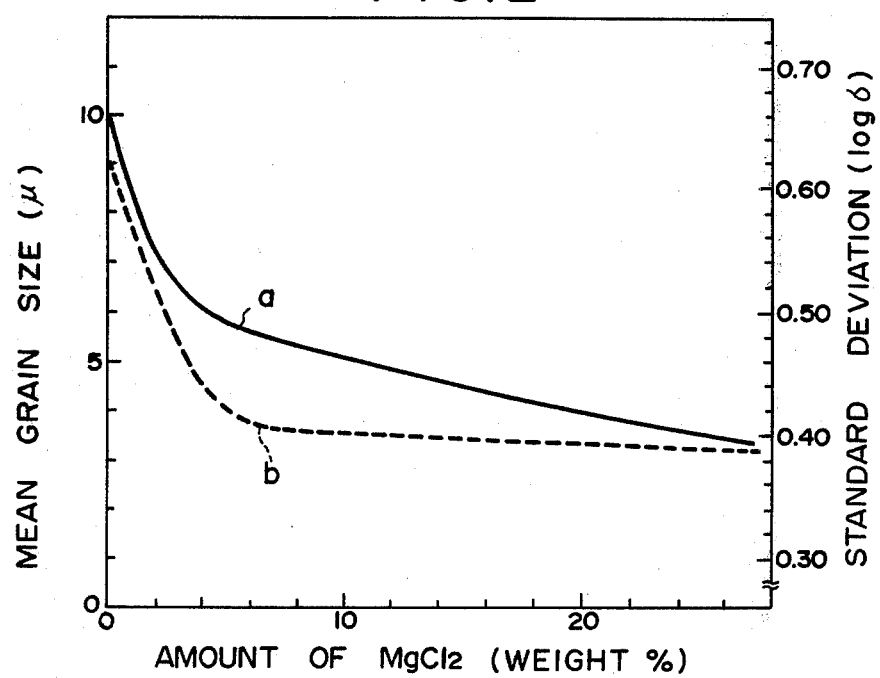

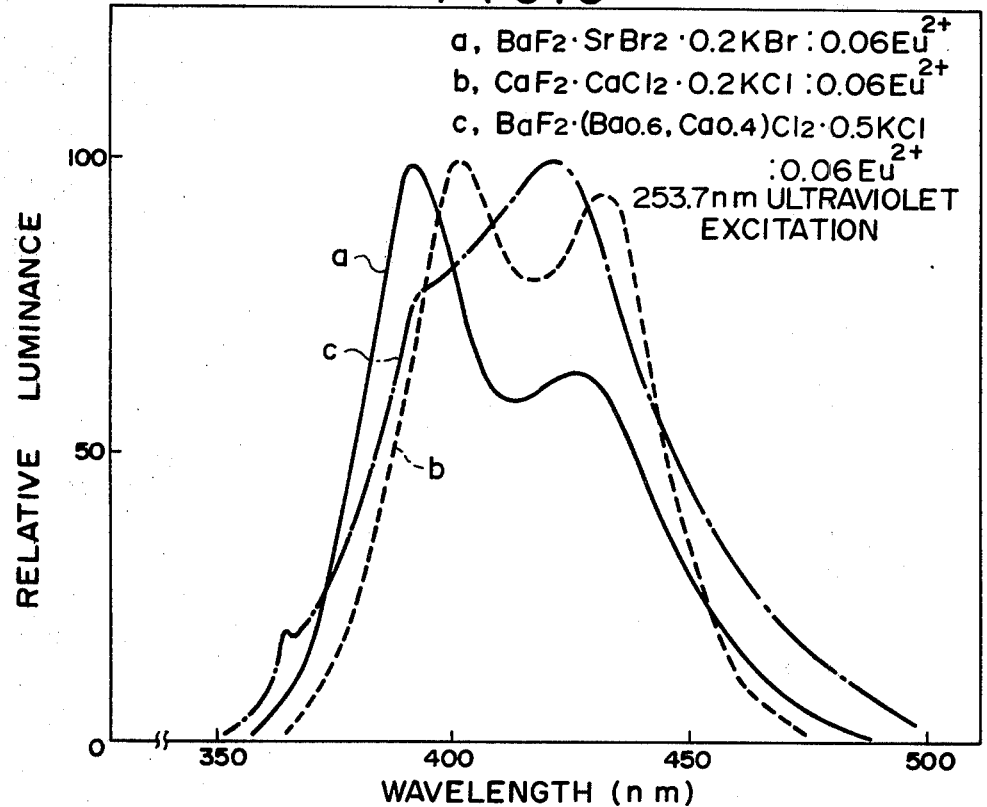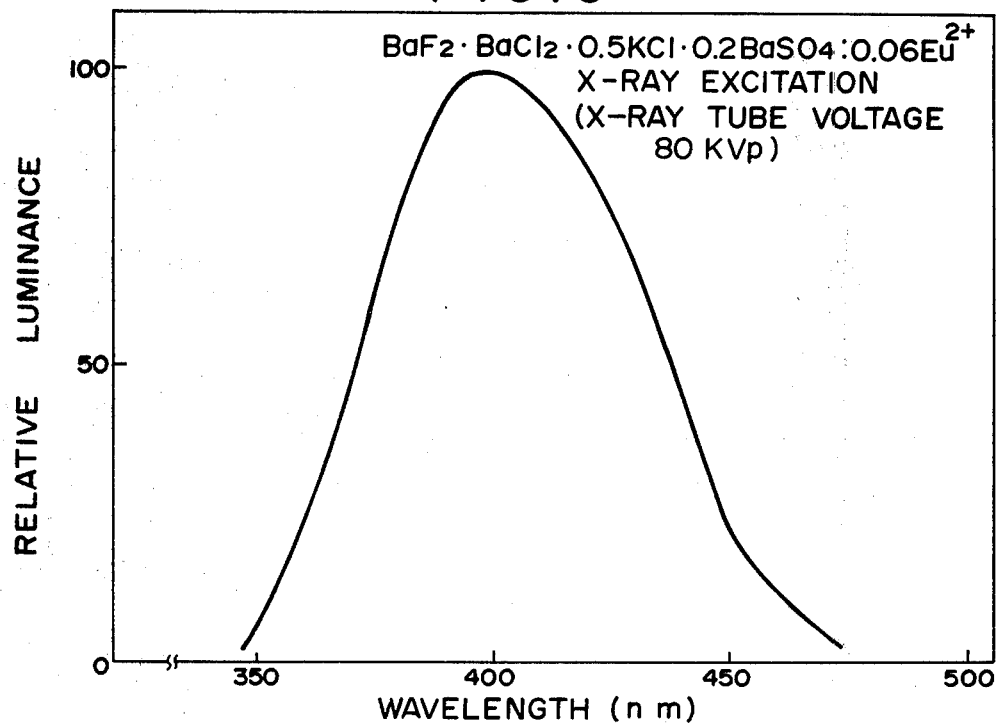

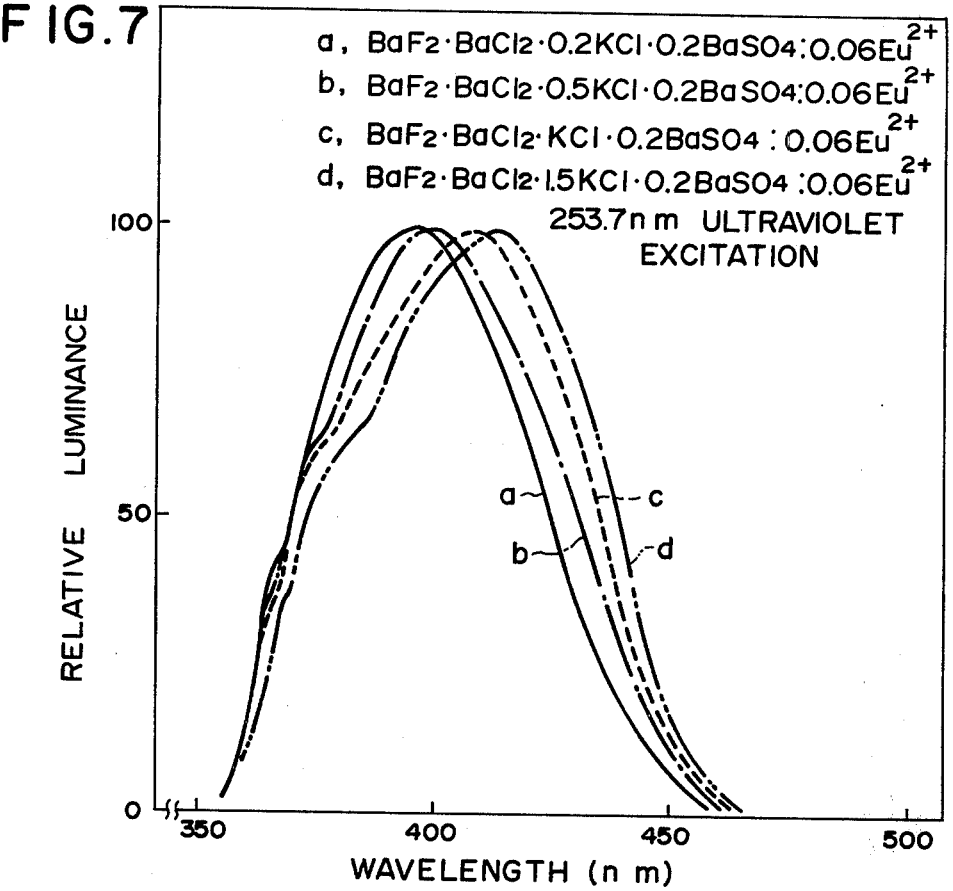
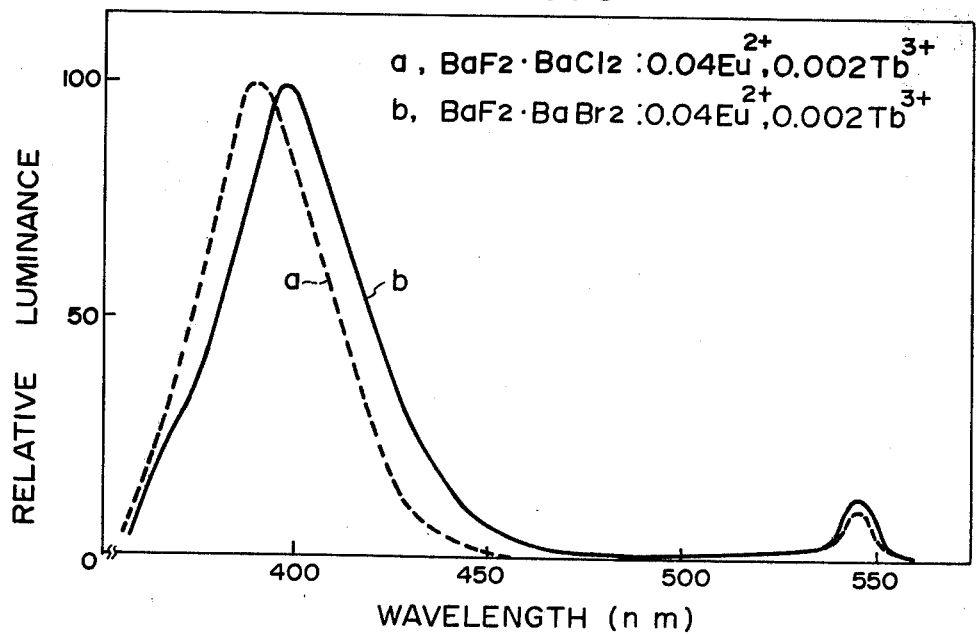

X1000

X1000 a, $(Ba_{0.9}, Mg_{0.1})F_2 \cdot BaCl_2 \cdot 0.5KCl : 0.06Eu^{2+}$
b, $(Ba_{0.5}, Mg_{0.5})F_2 \cdot BaCl_2 \cdot 0.5KCl : 0.06Eu^{2+}$
c, $MgF_2 \cdot BaCl_2 \cdot 0.5KCl : 0.06Eu^{2+}$ a, $(Ba_{0.9}, Mg_{0.1})F_2 \cdot BaCl_2 \cdot 0.1KCl : 0.06Eu^{2+}$
b, $(Ba_{0.9}, Mg_{0.1})F_2 \cdot BaCl_2 \cdot 0.5KCl : 0.06Eu^{2+}$
c, $(Ba_{0.9}, Mg_{0.1})F_2 \cdot BaCl_2 \cdot KCl : 0.06Eu^{2+}$

PHOSPHORS AND X-RAY IMAGE CONVERTERS USING THE SAME

BACKGROUND OF THE INVENTION

1. Field of the Invention

The present invention relates to a phosphor and an X-ray image converter using the phosphor. More particularly, the invention relates to a complex halide phosphor prepared by activating a complex host material comprising an alkaline earth metal fluoride and an alkaline earth metal halide as the essential components (said host material hereinafter referred to simply as "complex halide") with divalent europium ($Eu^{2+}$) or with divalent europium and trivalent terbium ($Tb^{3+}$) and also to an X-ray image converter whose fluorescent layer comprises the complex halide phosphor.

2. Description of the Prior Art

Japanese Patent Public Disclosure No. 42,582/1974 discloses a $Eu^{2+}$ activated complex halide phosphor, namely, a $Eu^{2+}$ activated alkaline earth metal fluorohalide phosphor having the composition represented by the formula

$(Ba_{1-x-y-p},Sr_x,Ca_y,Eu_p)F(Cl_{1-a-b}Br_a,I_b)$

Wherein x, y, p, a and b are numbers meeting the following conditions
$y \leq 0.20$, $x + y + p \leq 1$, $a + b \leq 1$ and
$0.001 \leq p \leq 0.20$, that is, a phosphor prepared by activating an alkaline earth metal fluorohalide comprising an alkaline earth metal fluoride and an alkaline earth metal halide with $Eu^{2+}$. As described in Japanese Patent Public Disclosure No. 42,582/1974 and shown in FIG. 1 hereof, the $Eu^{2+}$ activated alkaline earth metal fluorohalide phosphor exhibits highly efficient emission near the ultraviolet region under excitation by X-rays, ultraviolet rays or cathode ray. The phosphor is useful for X-ray intensifying screens (hereinafter referred to as "intensifying screens"), X-ray fluorescent screens (hereinafter referred to "fluorescent screens"), and X-ray image intensifier tubes (hereinafter referred to as "intensifier tubes"). In other words, it is useful as the phosphor for X-ray image converters (said intensifying screens, fluorescent screens and intensifier tubes being generally referred to as "X-ray image converters" in the specification of this invention) and as the phosphor for fluorescent lamps. Cathode ray tubes and intensifying screens employing the phosphor have been put to practical use. Recently, because of the need for increased sensitivity in X-ray image converters, there has arises a need for phosphors emitting more efficiently than the aforesaid $Eu^{2+}$ activated alkaline earth metal fluorohalide phosphor.

Also, although the aforesaid $Eu^{2+}$ activated alkaline earth metal fluorohalide phosphor exhibits highly efficient emission under X-ray, ultraviolet ray, and cathode ray excitation, its very long afterglow make it unsuitable for use in X-ray image converters, particularly intensifying screens. Thus, there has been an urgent need for a phosphor with improved afterglow characteristics.

SUMMARY OF THE INVENTION

This invention resulted from the inventors' efforts to find a phosphor free from the shortcomings of the known $Eu^{2+}$ activated alkaline earth metal fluorohalide phosphor.

It is, therefore, an object of this invention to provide a phosphor exhibiting more efficient emission than the conventional $Eu^{2+}$ activated alkaline earth metal fluorohalide phosphor under X-ray, ultraviolet ray and cathode ray excitation.

It is another object of this invention to provide a phosphor exhibiting shorter afterglow under X-ray, ultraviolet ray and cathode ray excitation than the conventional $Eu^{2+}$ activated alkaline earth metal fluorohalide phosphor.

It is a further object of this invention to provide an X-ray image converter having higher sensitivity than the X-ray image converter having a fluorescent layer using the conventional $Eu^{2+}$ activated alkaline earth metal fluorohalide phosphor.

It is still another object of this invention to provide an X-ray image converter exhibiting shorter afterglow than the X-ray image converter having a fluorescent layer using the aforesaid conventional $Eu^{2+}$ activated alkaline earth metal fluorohalide phosphor.

For accomplishing the aforementioned objects of this invention, the inventors made various investigations in search of host materials and activators for $Eu^{2+}$ activated alkaline earth metal fluorohalide phosphors and as the result of this investigations, they discovered that a complex halide phosphor prepared by activating with $Eu^{2+}$ a complex halide host material comprising an alkaline earth metal floride and an alkaline earth metal halide (namely the host material components of the aforesaid $Eu^{2+}$ activated alkaline earth metal fluorohalide phosphor) having further added thereto a potassium halide or a potassium halide and an alkaline earth metal sulfate as solid solution exhibits highly efficient emission which is as good as or superior to that of conventional $Eu^{2+}$ activated alkaline earth metal fluorohalide phosphor and exhibits superior afterglow characteristics to the conventional $Eu^{2+}$ activated alkaline earth metal fluorohalide phosphor under X-ray, ultraviolet ray or cathode ray excitation. They further found the so prepared phosphor to be particularly useful as the phosphor for X-ray image converters. Furthermore, it has also been discovered that a complex halide phosphor prepared by partially or wholly replacing the alkaline earth metal of the alkaline earth metal fluoride, which is one of the components of the host material constituting the above-mentioned $Eu^{2+}$ activated alkaline earth metal fluorohalide phosphor, with magnesium, or a complex halide phosphor prepared by further co-activating the above-mentioned $Eu^{2+}$ activated alkaline earth metal fluorohalide phosphor with $Tb^{3+}$ exhibits highly efficient emission equal to or superior to that of the $Eu^{2+}$ activated alkaline earth metal fluorohalide phosphor under X-ray, ultraviolet ray and cathode ray excitation and is also particularly useful as the phosphor for X-ray image converters.

The phosphor of this invention comprises as its essential components an alkaline earth metal fluoride and an alkaline earth metal halide activated by $Eu^{2+}$ or $Eu^{2+}$ and $Tb^{3+}$ and is represented by the following composition formula

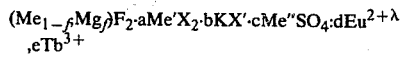
$(Me_{1-f}Mg_f)F_2 \cdot aMe'X_2 \cdot bKX' \cdot cMe''SO_4:dEu^{2+}\lambda, eTb^{3+}$ wherein Me, Me' and Me" each represents at least one of the alkaline earth metals of the group consisting of barium, strontium and calcium; X and X' each represents at least one of chlorine and bromine; and a, b, c, d, e and f are numbers defined by one of the following five combinations;

1. $0.80 \leq a_1 \leq 1.50$, $0.10 \leq b_1 \leq 1.50$, $c_1 = 0$, $0.001 \leq d_1 \leq 0.20$, $e_1 = 0$ and $f_1 = 0$.
2. $0.30 \leq a_2 \leq 1.50$, $0.10 \leq b_2 \leq 2.00$, $0.01 \leq c_2 \leq 1.00$, $0.001 \leq d_2 \leq 0.20$, $e_2 = 0$ and $f_2 = 0$.
3. $a_3 = 1$, $b_3 = 0$, $c_3 = 0$, $0.01 \leq d_3 \leq 0.10$, $0 < e_3 \leq 0.05$ and $f_3 = 0$.
4. $a_4 = 1$, $b_4 = 0$, $c_4 = 0$, $0.001 \leq d_4 \leq 0.20$, $e_4 = 0$ and $0 < f_4 \leq 1$.
5. $a_5 = 1$, $0 < b_5 \leq 1.5$, $c_5 = 0$, $0.001 \leq d_5 \leq 0.20$, $e_5 = 0$ and $0 < f_5 \leq 1$.

That is, the complex halide phosphors of this invention include the five kinds of phosphors represented by the following composition formulae:

1. $MeF_2 \cdot a_1Me'X_2 \cdot b_1KX' : d_1Eu^{2+}$ 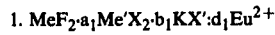

wherein Me and Me' each represents at least one of the alkaline earth metals of the group consisting of barium, strontium and calcium; X and X' each represents at least one of chlorine and bromine; and $a_1$, $b_1$ and $d_1$ are numbers meeting the conditions, $0.80 \leq a_1 \leq 1.50$, $0.10 \leq b_1 \leq 1.50$ and $0.001 \leq d_1 \leq 0.20$.

(Hereinafter called "phosphor-I")

2. $MeF_2 \cdot a_2Me'X_2 \cdot b_2KX' \cdot c_2Me''SO_4 : d_2Eu^{2+}$ 

wherein Me, Me' and Me'' each represents at least one of the alkaline earth metals of the group consisting of barium, strontium and calcium; X and X' each represents at least one of chlorine and bromine; and $a_2$, $b_2$, $c_2$ and $d_2$ are numbers meeting the conditions, $0.30 \leq a_2 \leq 1.50$, $0.10 \leq b_2 \leq 2.00$, $0.01 \leq c_2 \leq 1.00$ and $0.001 \leq d_2 \leq 0.20$.

(Hereinafter called "phosphor-II")

3. $MeF_2 \cdot Me'X_2 : d_3Eu^{2+}, e_3Tb^{3+}$ 

wherein Me and Me' each represents at least one of the alkaline earth metals of the group consisting of barium, strontium and calcium; X represents at least one of chlorine and bromine; and $d_3$ and $e_3$ are numbers meeting the conditions, $0.01 \leq d_3 \leq 0.10$ and $0 < e_3 \leq 0.05$.

(Hereinafter called "phosphor-III")

4. $(Me_{1-f_4}Mg_{f_4})F_2 \cdot Me'X_2 : d_4Eu^{2+}$ 

wherein Me and Me' each represents at least one of the alkaline earth metals of the group consisting of barium, strontium and calcium; X represents at least one of chlorine and bromine; and $d_4$ and $f_4$ are numbers meeting the conditions, $0.001 \leq d_4 \leq 0.20$ and $0 < f_4 \leq 1$.

(Hereinafter called "phosphor-IV")

5. $(Me_{1-f_5}Mg_{f_5})F_2 \cdot Me'X_2 \cdot b_5KX' : d_5Eu^{2+}$ 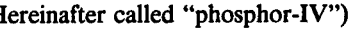

wherein Me and Me' each represents at least one of the alkaline earth metals of the group consisting of barium, strontium and calcium; X and X' each represents at least one of chlorine and bromine; and $b_5$, $d_5$ and $f_5$ are numbers meeting the conditions, $0 < b_5 \leq 1.5$, $0.001 \leq d_5 \leq 0.20$ and $0 < f_5 \leq 1$.

(Hereinafter called "phosphor-V")

Further, the X-ray image converter in accordance with this invention is characterized in that it has the fluorescent layer comprising the complex halide phosphors represented by the above composition formulae.

BRIEF DESCRIPTION OF THE DRAWING

FIG. 1 is a graph showing emission spectra of conventionally known $Eu^{2+}$ activated alkaline earth metal fluorohalide phosphors, FIG. 2 is a graph showing the relation between the amount of $MgCl_2$ used as a flux in the production of phosphor-I and the mean grain size of the phosphor obtained and the relation between the amount of $MgCl_2$ and the standard deviation of the grain size distribution of the phosphor obtained, wherein curve a shows the relation between the amount of $MgCl_2$ and the mean grain size, curve b shows the relation between the amount of $MgCl_2$ and the standard deviation of the grain size distribution, and the amount of $MgCl_2$ on the abscissa is shown by weight percent to the weight of the phosphor, FIGS. 4 and 5 are graphs showing the emission spectra of various types of phosphor-I under excitation by ultraviolet ray of 253.7 nm., FIG. 6 is a graph showing the emission spectrum of one type of phosphor-II under X-ray excitation, FIG. 7 is a graph showing the emission spectra of various types of phosphor-II under excitation by ultraviolet ray of 253.7 nm., FIG. 10 is a graph showing the emission spectra of two types of phosphor-III under X-ray excitation.

DESCRIPTION OF THE PREFERRED EMBODIMENTS

Figure 3:
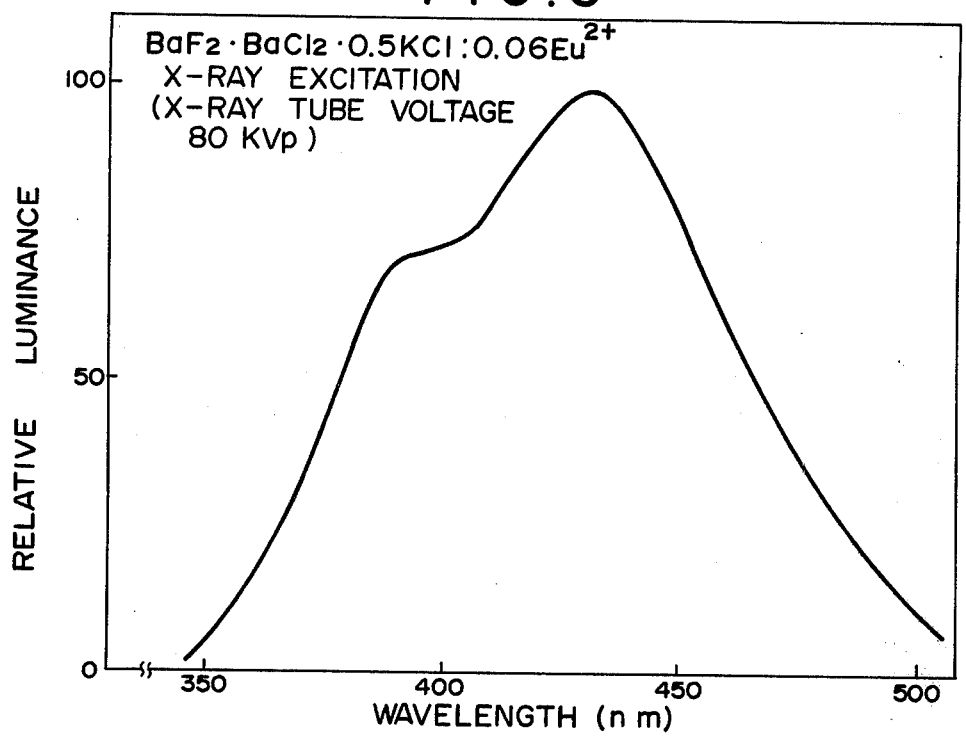
FIG. 3 is a graph showing the emission spectrum of one type of phosphor-I under X-ray excitation.

The complex halide phosphors of this invention, namely the "phosphor-I", "phosphor-II", "phosphor-III", "phosphor-IV" and "phosphor-V" will be explained below in detail.

(i) Phosphor-I

"Phosphor-I" is prepared by the following process. The following raw materials are used:

(1) An alkaline earth metal fluoride represented by the chemical formula $MeF_2$ (wherein Me represents at least one of the alkaline earth metals of the group consisting of barium, strontium and calcium), (2) An alkaline earth metal halide represented by the chemical formula $Me'X_2$ (wherein Me' represents at least one of the alkaline earth metals of the group consisting of barium, strontium and calcium and X represents at least one of chlorine and bromine), (3) A potassium halide represented by the chemical formula $KX'$ (wherein X' represents at least one of chlorine and bromine), and (4) At least one europium halide represented by the chemical formula $EuX_3''$ (wherein $X''$ represents at least one of chlorine and bromine), europium oxide ($Eu_2O_3$) and europium compounds which can be easily converted into $Eu_2O_3$ at high temperatures, such as a europium nitrate, a europium sulfate etc.

The aforesaid four raw materials are weighed out in a stoichiometric ratio expressed by the formula $$MeF_2 \cdot a_1 Me'X_2 \cdot b_1 KX' \cdot d_1 Eu^{3+}$$

wherein Me, Me', X and X' have the same significance as defined above and $a_1$, $b_1$ and $d_1$ are numbers meeting the conditions, $0.80 \leq a_1 \leq 1.50$, $0.10 \leq b_1 \leq 1.50$ and $0.001 \leq d_1 \leq 0.20$, and they are sufficiently mixed by means of a ball mill, a mixer mill etc. From the view point of the emission efficiency and the afterglow characteristics of the phosphor obtained, the especially preferred ranges of the $a_1$, $b_1$ and $d_1$ are $0.95 \leq a_1 \leq 1.20$, $0.20 \leq b_1 \leq 1.00$ and $0.01 \leq d_1 \leq 0.10$. In addition, when Me is the same alkaline earth metal as Me' and $a_1 = 1$, $MeF_2$ and $Me'X_2$ in the raw materials may be co-precipitated as $MeF_2 \cdot Me'X_2$. That is, an aqueous solution of an alkaline metal fluoride such as NaF, KF etc. is added in an equivalent amount to an aqueous solution of $Me'X_2$ to precipitate chemically as $Me'F_2 \cdot Me'X_2$. This reaction is represented by the following reaction formula $$2Me'X_2 + 2NaF \rightarrow Me'F_2 \cdot Me'X_2 \downarrow + 2NaX$$

Furthermore, a flux frequently used for producing complex halide phosphors, such as an ammonium halide (e.g., $NH_4Cl$, $NH_4Br$ or $NH_4F \cdot HF$), or the like may be used together with the aforesaid four raw materials.

Then, the aforesaid raw material mixture is placed in a heat resistant container and fired. The firing is performed in a weak reducing atmosphere such as, for example, a nitrogen atmosphere containing 2% hydrogen for converting $Eu^{3+}$ to $Eu^{2+}$. If the firing is performed in a reducing atmosphere, the alkaline earth metals of the host material are partially liberated to provide a body color of grey-black or yellow-grey to the phosphor, which results in greatly reducing the emission efficiency of the phosphor. A proper firing temperature range is 600–1000° C and an especially preferred temperature range is 700–800° C. The firing period depends on the amount of the raw materials, the firing temperature etc., but a proper period is 1-5 hours in the aforesaid firing temperature range. In addition, a phosphor exhibiting better emission efficiency can be obtained by firing the raw material mixture under the aforesaid firing condition to once form a phosphor and then further refiring the phosphor at least once under the same conditions as the aforesaid firing conditions.

After firing, the fired product is subjected to the treatments generally employed in the production of phosphor, such as washing, drying, sieving etc., to provide the desired phosphor. The washing treatment after firing is carried out with an organic solvent such as acetone, ethyl acetate, butyl acetate, ethyl alcohol etc. The reason for using these solvents is that the complex halides which are the host material of the phosphor are liable to decompose in hot water or warm water and if the fired product is washed using hot water or warm water as in the case of producing ordinary phosphors, the product decomposes gradually from the crystal surface into $MeF_2$, $Me'X_2$ and $KX'$.

By the process described above, the phosphor-I having the composition $$MeF_2 \cdot a_1 Me'X_2 \cdot b_1 KX' : d_1 Eu^{2+}$$

wherein Me, Me', X, X', $a_1$, $b_1$ and $d_1$ have the same significance as defined above, can be obtained. However, the phosphor-I obtained by this process generally has a large mean grain size and wide grain size distribution or, in other words, has a large standard deviation (log$\sigma$of grain size. In practical use, a large mean grain size and wide grain size distribution have a bad influence on the coating property of the phosphor when it is used in the formation of the fluorescent layer of an intensifier tube, fluorescent lamp, cathode ray tube etc. and, furthermore, the fluorescent layer obtained lacks in denseness and adhesion. Furthermore, when a phosphor having a large mean grain size and wide grain size distribution is used as the fluorescent layer for an intensifying screen or a fluorescent screen it has a bad influence on image quality. Still further, a wide grain size distribution is undesirable since it lowers the yield when the phosphor is subjected to strict classification in a specific grain size range.

The inventors also made various studies to obtain a phosphor-I having a desirable mean grain size and grain size distribution suitable for practical use by selection of the flux used in the production of the phosphor and as a result, it was discovered that when magnesium chloride ($MgCl_2$) is used as the flux, a phosphor having a desirable mean grain size and grain size distribution suitable for practical use can be obtained.

FIG. 2 is a graph showing the relation (curve a) between the amount (weight percent) of $MgCl_2$ used for producing the phosphor having the composition formula $BaF_2 \cdot BaCl_2 \cdot 0.5KCl : 0.06Eu^{2+}$ and the mean grain size of the phosphor obtained and the relation (curve b) between the amount of $MgCl_2$ and the standard deviation of the grain size distribution of the phosphor obtained. The amount of $MgCl_2$ on the abscissa is shown by weight percent to the weight of the phosphor, $BaF_2 \cdot BaCl_2 \cdot 0.5KCl : 0.06Eu^{2+}$. As is clear from FIG. 2, when the amount of $MgCl_2$ is in the range of from 2% to 20% by weight, phosphors having a mean grain size and grain size distribution suitable for practical use are obtained. If the amount of $MgCl_2$ is less than 2% by weight, both the mean grain size and the standard deviation become larger, giving rise to the undesirable influences described above. On the other hand, if the amount of $MgCl_2$ is larger than 20% by weight, the mean grain size becomes undesirably small although no problem arises concerning the standard deviation. The more preferred range of the amount of $MgCl_2$ is from 5% by weight to 15% by weight of the phosphor. The $MgCl_2$ used is removed by washing with an organic solvent after firing. Although FIG. 2 shows the relation between the amount of $MgCl_2$ added in producing the specific phosphor $BaF_2 \cdot BaCl_2 \cdot 0.5KCl : 0.06Eu^{2+}$ and the mean grain size of said phosphor and between the amount of $MgCl_2$ added and the standard deviation of the grain size distribution of said phosphor, it was found that the corresponding curves for other types of phosphor-I deviate very little from those for the aforesaid specific phosphor.

From the results described above, it will be understood that the amount of $MgCl_2$ used as the flux for obtaining phosphors having a mean grain size and grain size distribution suitable for practical use is from 2% to 20% by weight, more preferably from 5% to 15% by weight of the phosphor having the aforesaid composition formula.

Figure 4:
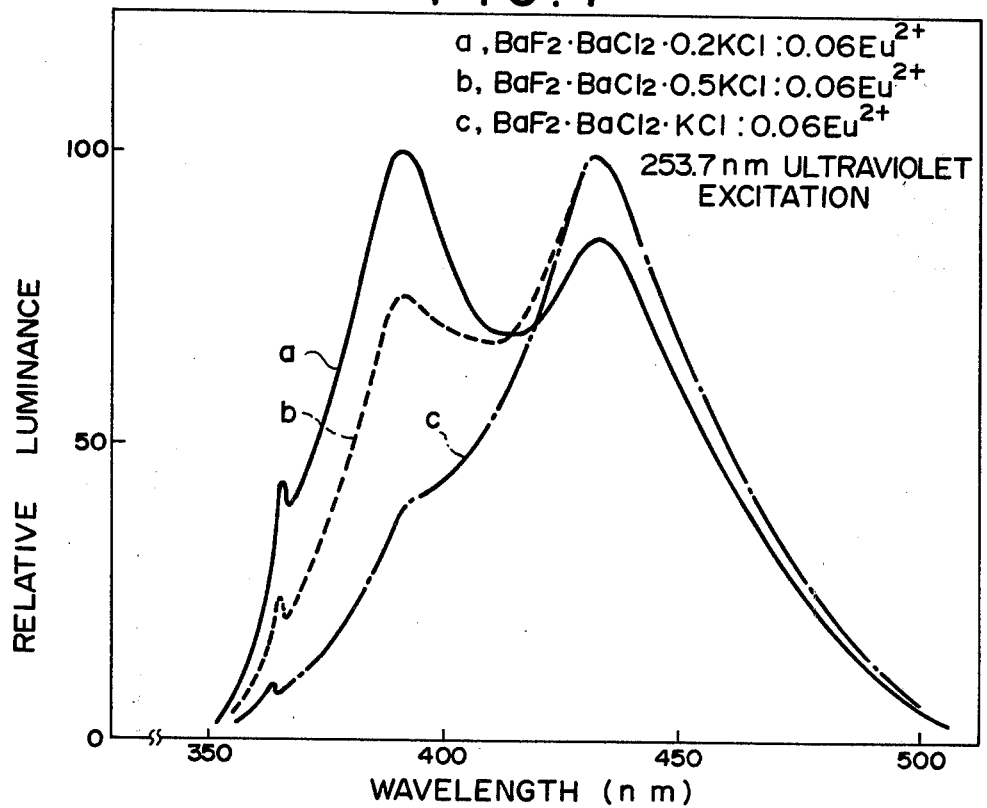

The phosphor-I exhibits highly efficient emission of near ultraviolet ray to blue light under X-ray, ultraviolet ray and cathode ray excitation and also exhibits excellent after glow characteristics. FIGS. 3, 4 and 5 illustrate the emission spectra of various types of phosphor-I. Namely, FIG. 3 is a graph showing the emission spectrum of one type of phosphor-I under X-ray excitation and FIGS. 4 and 5 are graphs showing the emission spectra of various types of phosphor -I under ultraviolet ray excitation. As is clear from FIGS. 3, 4 and 5, the emission spectrum of phosphor-I has two emission peaks, i.e., the emission peak at the near ultraviolet region of from 390 nm. to 400 nm. and the emission peak at the blue region of from 420 nm. to 435 nm. and further as is shown in FIG. 4, with the increase of the amount of KCl which is a component of the host material of the phosphor, the emission peak at the blue region of from 420 nm. to 435 nm. increases gradually. Although FIG. 4 is a graph showing the emission spectra of three types of phosphors having the composition formula $BaF_2 \cdot BaCl_2 \cdot b_1KCl : 0.06Eu^{2+}$ under ultraviolet ray excitation, it has also been confirmed that in the case of other phosphors of this type having other composition formulae than the above one or in the case of X-ray or cathode ray excitation, the emission peak at the blue region of from 420 nm. to 435 nm. increases gradually with the increase of the amount of KCl. Also, though not shown in the drawing, the emission spectra of the aforesaid phosphors under electron beam excitation were found to be almost the same as the emission spectra under X-ray excitation.

ii) Phosphor-II

"Phosphor-II" is prepared by the following process.

The following raw materials are used:

1) An alkaline earth metal fluoride represented by the chemical formula $MeF_2$ (wherein Me represents at least one of the alkaline earth metals of the group consisting of barium, strontium and calcium), 2) An alkaline earth metal halide represented by the chemical formula $Me'X_2$ (wherein Me' represents at least one of the alkaline earth metals of the group consisting of barium, strontium and calcium and X represents at least one of chlorine and bromine), 3) A potassium halide represented by the chemical formula $KX'$ (wherein $X'$ represents at least one of chlorine and bromine), 4) An alkaline earth metal sulfate represented by the chemical formula $Me''SO_4$ (wherein Me'' represents at least one of the alkaline earth metals of the group consisting of barium, strontium and calcium), and 5) At least one europium halide represented by the chemical formula $EuX''_3$ (wherein $X''$ represents at least one of chlorine and bromine), europium oxide ($Eu_2O_3$) and europium compounds which can be easily converted into $Eu_2O_3$ at high temperatures, such as europium nitrate, europium sulfate etc.

The aforesaid five raw materials are weighed out in a stoichiometric ratio expressed by the formula

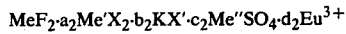

wherein Me, Me', Me", X and X' have the same significance as defined above and $a_2$, $b_2$, $c_2$ and $d_2$ are numbers meeting the conditions $0.30 \leq a_2 \leq 1.50$, $0.10 \leq b_2 \leq 2.00$, $0.01 \leq c_2 \leq 1.00$ and $0.001 \leq d_2 \leq 0.20$, and mixed well by means of a ball mill, a mixer mill etc.

From the view point of the emission efficiency, the afterglow characteristics, the grain shape and the specific surface area of the phosphor obtained, the especially preferable ranges of the $a_2$, $b_2$, $c_2$ and $d_2$ values are $0.80 \leq a_2 \leq 1.20$, $0.20 \leq b_2 \leq 1.20$, $0.05 \leq C_2 \leq 0.40$ and $0.01 \leq d_2 \leq 0.10$. In addition, when Me is the same alkaline earth metal as Me' and $a_2 = 1$, $MeF_2$ and $Me'X_2$ in the aforesaid raw materials may be co-precipitated as $MeF_2 \cdot Me'X_2$ as in the case of producing phosphor-I.

Furthermore, a flux generally used in the case of producing phosphors, such as an ammonium halide (e.g., $NH_4Cl$, $NH_4Br$, $NH_4F \cdot HF$) or ammonium sulfate $(NH_4)_2SO_4$ may be used together with the aforesaid five raw materials.

Then, the raw material mixture described above is placed in a heat resistant container and fired. The firing conditions are completely the same as those in case of producing phosphor-I described above.

After firing, the five products is subjected to the treatments generally employed in the production of phosphors, such as washing, drying and sieving. In addition, the washing after firing is carried out by an organic solvent such as acetone, ethyl acetate, butyl acetate, ethyl alcohol etc., as in the case of producing phosphor-I. The reason for using these solvents is that the complex halides which are the host material of the phosphor are liable to decompose in hot water or warm water and if the fired product is washed with hot water or warm water as in the case of producing ordinary phosphors, the product decomposes gradually from the crystal surface into $MeF_2$, $Me'X_2$, $KX'$ and $Me''SO_4$.

By the process described above, the phosphor-II having the composition formula

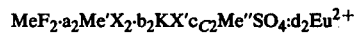

wherein Me, Me', X, X', $a_2$, $b_2$, $C_2$ and $d_2$ have the same significance as defined above, can be obtained.

The phosphor-II exhibits highly efficient emission of near ultraviolet to blue light under X-ray, ultraviolet ray and cathode ray excitation and also excellent afterglow characteristics. Furthermore, the phosphor has suitable grain shape and specific surface area for forming a fluorescent layer.

FIGS. 6 and 7 illustrate the emission spectra of various types of phosphor-II. FIG. 6 is a graph showing the emission spectrum of one type of phosphor-II under X-ray excitation and FIG. 7 is a graph showing the emission spectra of various types of phosphor-II under ultraviolet ray excitation. As is clear from FIGS. 6 and 7, the emission spectrum of phosphor-II of this invention is at the near untraviolet to blue region and as is shown in FIG. 7, with the increase of the amount of KCl which is a component of the host material of the phosphor, the emission peak shifts gradually to the longer wave length side and thus the emission in the blue region increases gradually. Although FIG. 7 shows the emission spectra of three types of phosphors having the composition formulae $BaF_2 \cdot BaCl_2 \cdot b_2KCl \cdot 0.2BaSO_4 0.06Eu^{2+}$ under ultraviolet ray excitation, it has also been confirmed that in the case of other phosphors of the same type having different composition formulae and in the case of exciting these phosphors by X-rays and cathode rays, the emission in the blue region increases gradually with the increase in the amount of KCl. Furthermore, though not shown in the drawing, the emission spectra of the phosphors under cathode ray excitation were found to be almost the same as the emission spectra of the phosphors under X-ray excitation.

Phosphor-II exhibits highly efficient emission under X-ray, ultraviolet ray and cathode ray excitation and also has excellent afterglow characteristics. Furthermore, the phosphor possesses suitable grain shape and specific surface area for forming a fluorescent layer.

Figure 8:
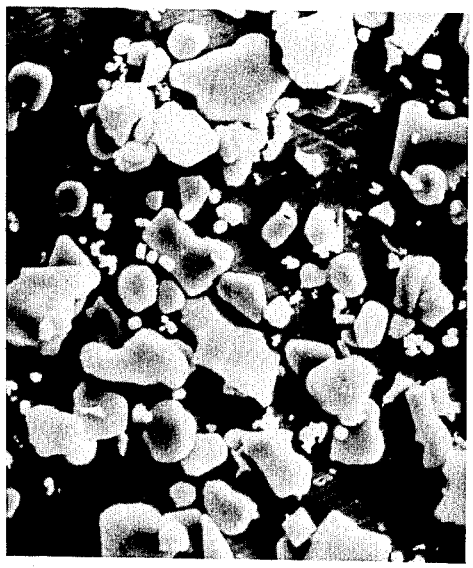
FIG. 8 is a scanning type electron microphotograph of a conventionally known $Eu^{2+}$ activated alkaline earth metal fluorohalide phosphor.
Figure 9:
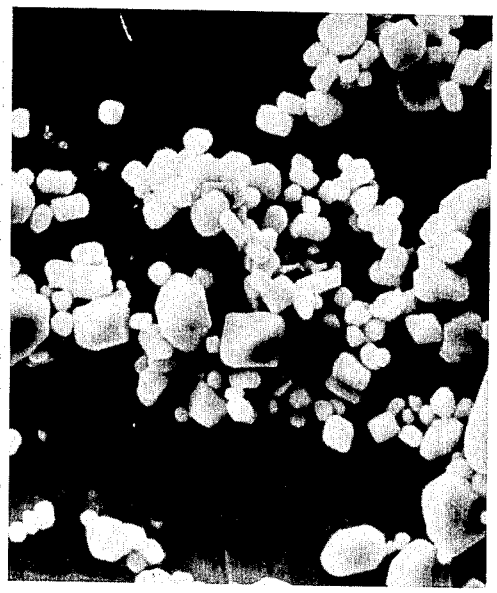
FIG. 9 is a scanning type electron microphotograph of phosphor-II.

FIG. 9 shows a scanning type electron microphotograph of phosphor-II. As is shown in this figure, the grains of phosphor-II are clearly ball shaped and not plate shaped as are the grains of the conventional $Eu^{2+}$ activated alkaline earth metal fluorohalide phosphor illustrated in FIG. 8. Therefore, phosphor-II of this invention has smaller specific surface area than that of the conventional $Eu^{2+}$ activated alkaline earth metal fluorohalide phosphor.

In table 1, there are shown the oil absorption volumes (to 100g of phosphor) of the $CaWO_4$ phosphor, the conventional $BaF_2 \cdot BaCl_2 : 0.06Eu^{2+}$ phosphor, the $BaF_2 \cdot BaCl_2 \cdot 0.2KCl : 0.06Eu^{2+}$ phosphor (phosphor-I) and the $BaF_2 \cdot BaCl_2 \cdot 0.2KCl \cdot c_2BaSO_4 : 0.06Eu^{2+}$ phosphor (phosphor-II) together with their specific surface areas. The oil absorption volume shown in the table was determined in the following manner. That is, 2–20g of a phosphor having a mean grain size of 5.0μ was dried for 2 hours at 105–110° C, placed on a glass plate, and while purified linseed oil was added dropwise thereto by a burette, the phosphor was kneaded with the linseed oil by means of a spatula. When the kneaded mixture became rod shape, the addition of linseed oil was stopped, the amount of the consumed linseed oil was measured, and then the oil absorption volume to 100g of the phosphor was determined by the following equation. The smaller the oil absorption volume is, the smaller the specific surface area is.

Oil absorption volume to 100g of phosphor $= \frac{A}{B} \times 100g$

A: The amount (g) of consumed linseed oil. B: The amount (g) of the phosphor.

The specific surface area shown in Table 1 was measured directly by means of a specific surface area meter.

Table 1

| Phosphor | Weight of oil absorption volume to 100g of phosphor (g) | Specific surface area value (m²/g) |
| --- | --- | --- |
| $CaWO_4$ | 12 | 1.0 |
| $BaF_2 \cdot BaCl_2 : 0.06Eu^{2+}$ | 28 | 3.0 |
| $BaF_2 \cdot BaCl_2 \cdot 0.2KCl : 0.06Eu^{2+}$ (phosphor-I) | 25 | 1.9 |
| $BaF_2 \cdot BaCl_2 \cdot 0.2KCl \cdot 0.2BaSO_4 : 0.06Eu^{2+}$ | 17 | 1.4 |
| $BaF_2 \cdot BaCl_2 \cdot 0.2KCl \cdot 0.4BaSO_4 : 0.06Eu^{2+}$ (phosphor-II) | 16 | 1.3 |

As is clear from the results shown in Table 1, phosphor-II has notably smaller specific surface area than that of the conventional $Eu^{2+}$ activated alkaline earth metal fluorohalide phosphor and the specific area thereof is similar to that of the $CaWO_4$ phosphor. Also, as is clear from the comparison of the result of the $BaF_2 \cdot BaCl_2 \cdot 0.2KCl : 0.06Eu^{2+}$ phosphor (phosphor-I) and the result of the $BaF_2 \cdot BaCl_2 \cdot 0.2KCl \cdot c_2BaSO_4 : 0.06Eu^{2+}$ phosphor (Phosphor-II), the component having the effect of forming ball shaped grain and reducing the specific surface area in phosphor-II is mainly $Me''SO_4$ which is a component of the host material of the phosphor. That is to say, in the $BaF_2 \cdot BaCl_2 \cdot 0.2KCl : 0.06Eu^{2+}$ phosphor (phosphor-I) which does not contain $Me''SO_4$ as a component of the host material, there was no remarkable reduction of the specific surface area as in phosphor-II.

As described above, the grains of phosphor-II are spherical or ball shaped and have small specific surface area. Thus, a fluorescent layer using the phosphor-II has a high packing density and hence has excellent denseness and adhesion. Thus, since phosphor-II has excellent afterglow characteristics as compared with the conventional $Eu^{2+}$ activated alkaline earth metal fluorohalide phosphor, has suitable grain shape and specific surface area for forming a fluorescent layer and exhibits highly efficient emission under X-ray, ultraviolet ray and cathode ray excitation, the phosphor is highly useful for X-ray image converters, fluorescent lamps and cathode ray tubes.

iii) Phosphor-III

"Phosphor-III" is prepared by the following process.
The following raw material are used:
1) An alkaline earth metal fluoride represented by the chemical formula $MeF_2$ (wherein Me represents at least one of barium, strontium and calcium),
2) An alkaline earth metal halide represented by the chemical formula $Me'X_2$ (Wherein Me' represents at least one of barium, strontium and calcium and X represents at least one of chlorine and bromine), and
3) At least one terbium halide represented by the chemical formula $TbX'_3$ (wherein X' represents at least one of chlorine and bromine), terbium oxide ($Tb_4O_7$) and terbium compounds which can be easily converted into $Tb_4O_7$ at high temperatures, such as terbium nitrate, terbium sulfate etc., and at least one europium halide represented by the chemical formula $EuX'_3$ (wherein X' has the same significance as defined above), europium oxide ($Eu_2O_3$) and europium compounds which can be easily converted into $Eu_2O_3$ at high temperatures, such as europium nitrate, europium sulfate, etc.

The aforesaid three raw materials are weighed out in a stoichiometric ratio expressed by the formula

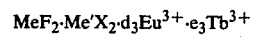

wherein Me, Me' and X have the same significance as defined above and $d_3$ and $e_3$ are numbers meeting the conditions $0.01 \leq d_3 \leq 0.10$ and $0 < e_3 \leq 0.05$, and are mixed well by means of a ball mill, a mixer mill etc. In addition, when Me is the same alkaline earth metal as Me', $MeF_2$ and $Me'X_2$ in the raw materials may be co-precipitated as $MeF_2 \cdot Me'X_2$ as in the case of producing phosphor-I.

Also, a flux frequently used in case of producing complex halide phosphors, such as an ammonium halide (e.g., $NH_4Cl$, $NH_4Br$, $NH_4F \cdot HF$) or the like may be used together with the aforesaid three raw materials.

Then, the aforesaid raw material mixture is placed in a heat resistant container and fired. The firing conditions are completely the same as those in case of producing phosphor-I.

After firing, the fired product is subjected to the treatments generally employed in the production of phosphors, such as washing, drying, sieving etc., to provide the desired phosphor. In addition, the washing treatment after firing is performed by cold water below 15° C or by an organic solvent such as acetone, ethyl acetate, butyl acetate, ethyl alcohol etc., as in the case of producing phosphor-I. The reason for using one of these is that the complex halides which are the host material are liable to decompose in hot or warm water and hence if the product is washed with hot water or warm water as in the production of conventional phosphors, the product decomposes gradually from the crystal surface into $MeF_2$ and $Me'X_2$.

Thus, by the process described above, phosphor-III represented by the composition formula $$MeF_2 \cdot Me'X_2 : d_3Eu^{2+}, e_3Tb^{3+}$$

wherein Me, Me', $d_3$ and $e_3$ have the same significance as defined above, can be obtained.

Phosphor-III exhibits highly efficient emission of near ultraviolet to green light under X-ray, ultraviolet ray and cathode ray excitation.

In FIG. 10, the emission spectra of two types of phosphor-III under X-ray excitation are illustrated. As is clear from FIG. 10, phosphor-III exhibits near ultraviolet and green emission. Also, though not shown in the drawing, the emission spectra of the phosphors under ultraviolet ray and cathode ray excitation were found to be almost the same as the emission spectra thereof under X-ray excitation.

iv) Phosphor-IV

"Phosphor-IV" is prepared by the following process.

The following raw materials are used:
1) An alkaline earth metal fluoride represented by the chemical formula $MeF_2$ (wherein Me represents at least one of barium, strontium and calcium),
2) Magnesium fluoride represented by the chemical formula $MgF_2$,
3) An alkaline earth metal halide represented by the chemical formula $Me'X_2$ (wherein Me' represents at least one of barium, strontium and calcium and X represents at least one of chlorine and bromine), and
4) At least one europium halide represented by the chemical formula $EuX'_3$ (wherein X' represents at least one of chlorine, bromine and fluorine), europium oxide ($Eu_2O_3$) and europium compounds which can be easily converted into $Eu_2O_3$ at high temperatures, such as europium nitrate, europium sulfate etc.

The aforesaid four raw materials are weighed out in a stoichiometric ratio expressed by the formula $$(Me_{1-f_4}, Mg_{f_4})F_2 \cdot Me'X_2 \cdot d_4Eu^{3+}$$

wherein Me, Me' and X have the same significance as defined above and $d_4$ and $F_4$ are numbers meeting the conditions $0.001 \leq d_4 \leq 0.20$ and $0 < f_4 \leq 1$, and mixed well by means of a ball mill, a mixer mill etc. From the view point of emission efficiency, the especially preferred ranges of the $d_4$ and $f_4$ values of the mixture composition formula are $0.01 \leq d_4 \leq 0.10$ and $0 < f_4 \leq 0.5$. In addition, when $f_4 = 1$ in the aforesaid mixture composition formula, that is, when the mixture composition formula is shown by $$MgF_2 \cdot Me'X_2 \cdot d_4Eu^{3+},$$

the raw material 1) among the four raw materials described above is as a matter of course unnecessary.

Furthermore, a flux frequently used in the production of complex halide phosphors, such as an ammonium halide (e.g., $NH_4Cl$, $NH_4Br$, $NH_4F \cdot HF$) or the like may be used together with the aforesaid three or four raw materials.

Then, the aforesaid raw material mixture is placed in a heat resistant container and fired. The firing conditions are completely same as those in the case of producing phosphor-I.

After firing, the fired product is subjected to the treatments generally employed in the production of phosphors, such as washing, drying, sieving etc., to provide the desired phosphor. In addition, the washing treatment after firing is performed with cold water below 15° C or with an organic solvent such as acetone, ethyl acetate, butyl acetate, ethyl alcohol etc. This is because the complex halides which are the host material are liable to decompose in hot water or warm water and if the product is washed with hot water or warm water as in the case of producing ordinary phosphors, the product decomposes gradually from the crystal surface into $(Me_{1-f_4}, Mg_{f_4})F_2$ and $Me'X_2$.

Thus, by the process described above, phosphor-IV shown by the composition formula $$(Me_{1-f_4}, Mg_{f_4})F_2 \cdot Me'X_2 : d_4Eu^{2+}$$

wherein Me, Me', X, $d_4$ and $f_4$ have the same significance as defined above, can be obtained.

Figure 11:
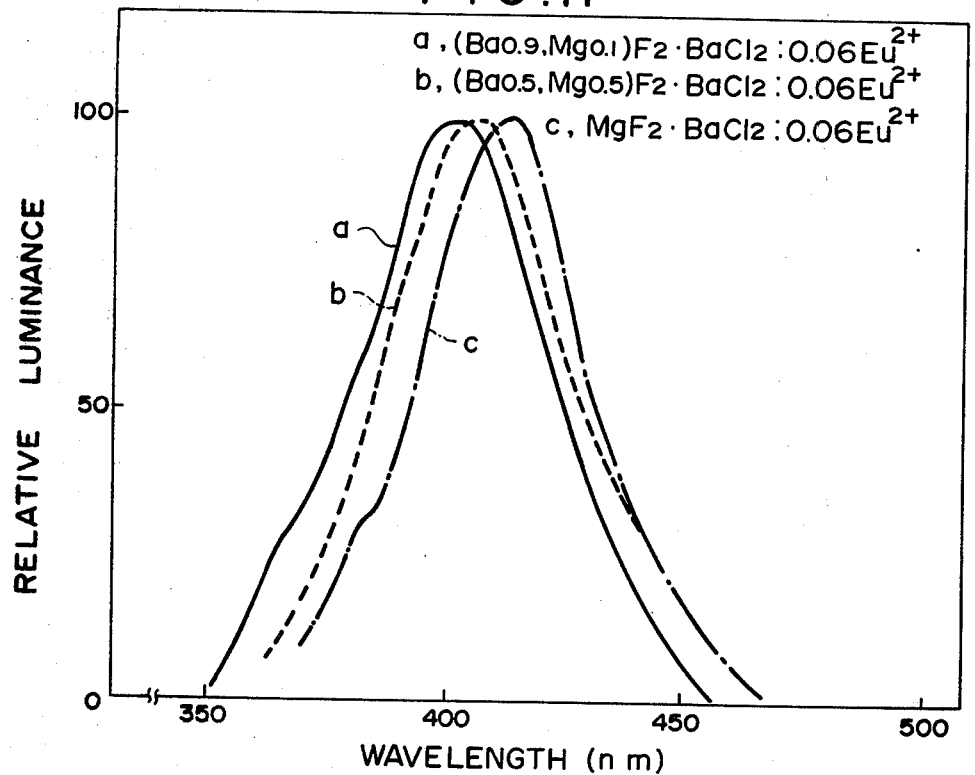
FIG. 11 is a graph showing the emission spectra of various types of phosphor-IV under X-ray excitation.

Phosphor-IV exhibits highly efficient emission of near ultraviolet to blue light under X-ray, ultraviolet ray and cathode ray excitation. FIG. 11 illustrates the emission spectra of various types of phosphor-IV under X-ray excitation. As is clear from FIG. 11, phosphor-IV exhibits near ultraviolet to blue emission and, with the increase in the amount ($f_4$ value) of Mg which is a component of the host material, the emission peak shifts gradually to the longer wave length side to gradually increase blue emission. Although FIG. 11 is a graph showing the emission spectra of the $(Ba_{1-f_4}, Mg_{f_4})F_2 \cdot BaCl_2 : 0.06Eu^{2+}$ phosphors under X-ray excitation, it has also been confirmed that in the case of the phosphors of the same type having other composition formulae than the above or in the case of ultraviolet ray and cathode ray excitation, with the increase of the amount of Mg which is a component of the host material, the emission peak shifts gradually to the longer wave length side and blue emission increases gradually.

v) Phosphor-V

"Phosphor-V" is prepared by the following process.

The following raw materials are used:
1) An alkaline earth metal fluoride represented by the chemical formula $MeF_2$ (wherein Me represents at least one of barium, strontium and calcium),
2) Magnesium fluoride represented by the chemical formula $MgF_2$,
3) An alkaline earth metal halide represented by the chemical formula $Me'X_2$ (wherein Me' represents at least one of barium, strontium and calcium and X represents at least one of chlorine and bromine), 4) A potassium halide represented by the chemical formula KX' (wherein X' represents at least one of chlorine and bromine), and 5) At least one europium halide represented by the chemical formula $EuX''_3$ (wherein X'' represents at least one of chlorine, bromine and fluorine), europium oxide ($Eu_2O_3$) and europium compounds which can be easily converted into $Eu_2O_3$ at high temperatures, such as europium nitrate, europium sulfate etc.

The aforesaid five raw materials are weighed out in a stoichiometric ratio expressed by the formula $$(Me_{1-f_5}, Mg_{f_5})F_2 \cdot Me'X_2 \cdot b_5 KX' \cdot d_5 Eu^{3+}$$

wherein Me, Me', X and X' have the same significance as defined above and $b_5$, $d_5$ and $f_5$ are numbers meeting the conditions $0 < b_5 \leq 1.5$, $0.001 \leq d_5 \leq 0.20$ and $0 < f_5 \leq 1$, and are mixed well by means of a ball mill, a mixer mill etc. From the view point of emission efficiency and afterflow characteristics, the expecially preferred ranges of the $b_5$, $d_5$ and $f_5$ values of the aforesaid composition formula are $0.005 \leq b_5 \leq 0.70$, $0.01 \leq d_5 \leq 0.10$ and $0 < f_5 \leq 0.50$. In addition, when $f_5 = 1$ in the aforesaid mixture composition formula, that is, when the mixture composition formula is $$MgF_2 \cdot Me'X_2 \cdot b_5 KX' \cdot d_5 Eu^{3+}$$

raw material 1) in the aforesaid five raw materials is as a matter of course unnecessary. Furthermore, a flux frequently used in the production of complex halide phosphors, such as ammonium halide (e.g., $NH_4Cl$, $NH_4Br$, $NH_4F \cdot HF$) or the like may be used together with the aforesaid four or five raw materials.

Then, the aforesaid raw material mixture is placed in a heat resistant container and fired. The firing conditions are completely the same as those in the case of producing phosphor-I.

After firing, the fired product is subjected to the treatments generally employed in the production of phosphors, such as washing, drying, sieving etc. In addition, the washing treatment after firing is also performed with cold water below 15° C or with an organic solvent such as acetone, ethyl acetate, butyl acetate, ethyl alcohol etc., as in the case of producing phosphor-I. This is because the complex halides which are the host material of the phosphor are liable to decompose in hot water or warm water and hence if the product is washed with hot water or warm water as in the case of producing ordinary phosphors, the product decomposes gradually from the crystal surface into $(Me_{1-f_5}, Mg_{f_5})F_2$, $Me'X_2$ and $KX'$. In this case, however, it is preferred to perform the washing with cold water. The reasons are as follows:

(1) A phosphor having higher dispersibility is obtained when washing is performed with cold water.

(2) When, in particular, a flux is used at firing, the flux can be more easily removed from the fired product by washing it with cold water.

(3) In the case of using an organic solvent for washing, there is a possibility of fire breaking out at the drying step after washing but there is no such possibility in the case of using cold water.

(4) The use of cold water for washing is more economically advantageous than the use of an organic solvent.

Figure 12:
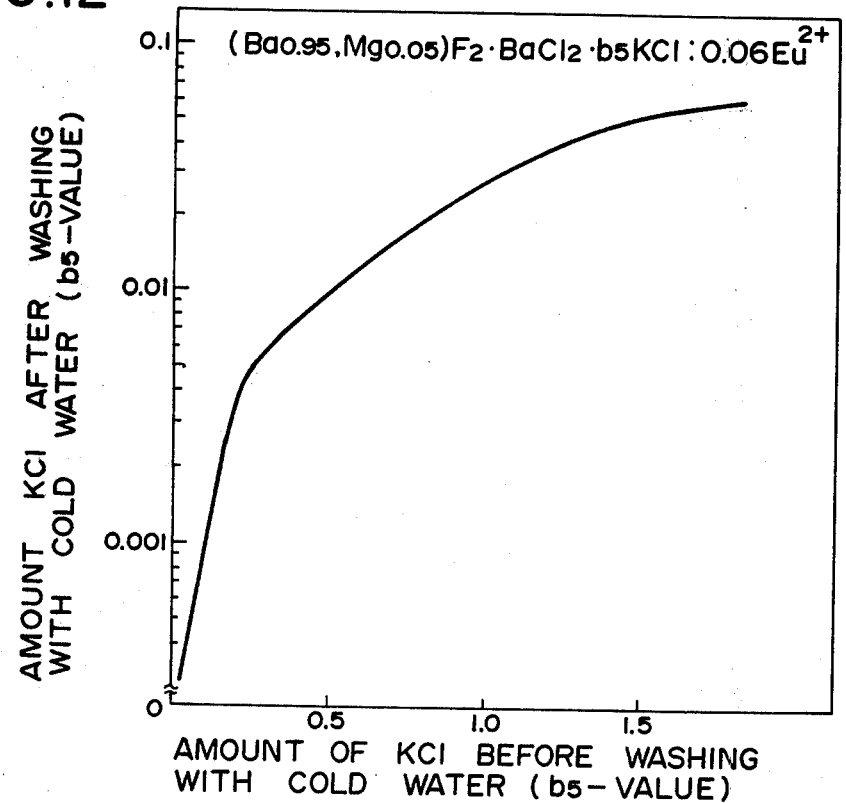
FIG. 12 is a graph showing the relation between the amount ($b_5$ value) of KX' of one type of phosphor-V before washing with cold water and the amount ($b_5$ value) of remaining KX' of the phosphor after washing with cold water.

However, when the fired product is washed with cold water, the potassium halide (KX') component of the host material of the phosphor is dissolved off. FIG. 12 is a graph showing the relation between the amount ($b_5$ value) of KX' of phosphor-V before washing with cold water and the amount ($b_5$ value) of remaining KX' after washing with cold water. Although FIG. 12 is a graph showing the relation between the $b_5$ value of the specific phosphor $(Ba_{0.95}, Mg_{0.05})F_2 \cdot BaCl_2 \cdot b_5 KCl : 0.06Eu^{2+}$ before washing with cold water and the $b_5$ value of the same phosphor washed once with cold water at the rate of 1 liter per 200g of the phosphor, experiments conducted by the inventors confirmed that in the case of phosphors of the same type as above having different composition formulae than the aforesaid formula, the relation between the $b_5$ value before washing and the $b_5$ value after washing is almost the same as that shown in FIG. 12 when the washing conditions are the same. As is clear from FIG. 12, when the phosphor having a $b_5$ value of 1.5, which is the upper limit of the amount of KCl, is washed with cold water, the $b_5$ value after washing becomes 0.5. That is, when phosphor having the composition formula $$(Me_{1-f_5}, Mg_{f_5})F_2 \cdot Me'X_2 \cdot b_5 KX' : d_5 Eu^{2+}$$

wherein Me and Me' each represents at least one of barium, strontium and calcium; X and X' each represents at least one of chlorine and bromine; and $b_5$, $d_5$ and $f_5$ are numbers meeting the conditions $0 < b_5 \leq 1.5$, $0.001 \leq d_5 \leq 0.20$ and $0 < f_5 \leq 1$, is washed once with cold water at a rate of 1 liter per 200g of the phosphor, the composition formula of the phosphor becomes as follows $$(Me_{1-f_5}, Mg_{f_5})F_2 \cdot Me'X_2 \cdot b_5 KX' : d_5 Eu^{2+}$$

wherein Me, Me', X, X', $d_5$ and $f_5$ have the same significance as in the above formula and $b_5$ is a number meeting the condition $0 < b_5 \leq 0.5$.

In addition, experiments conducted by the inventors confirmed that when the phosphor-V is washed once with cold water at a rate of 1 liter per 200g of the phosphor as described above, the washed phosphor shows sufficiently high dispersibility.

Phosphor-V exhibits highly efficient emission of near ultraviolet to blue light under X-ray, ultraviolet ray and cathode ray excitation and also has excellent afterglow characteristics.

Figure 13:
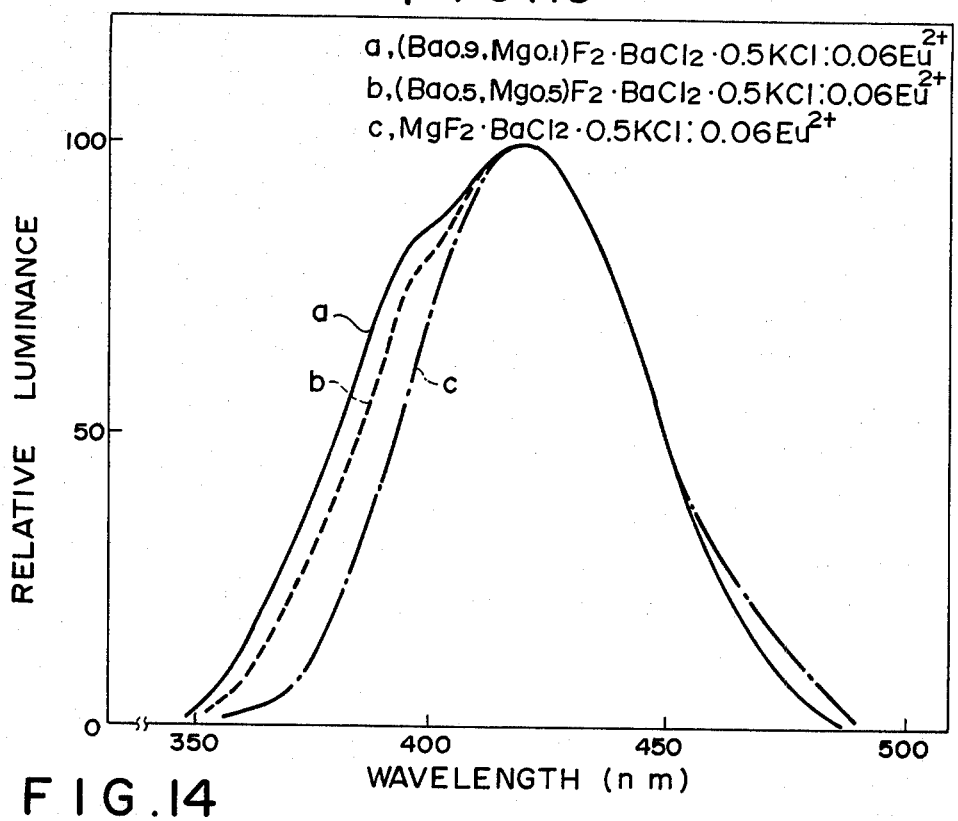
FIGS. 13 and 14 are graphs showing the emission spectra of various types of phosphor-V under X-ray excitation.
Figure 14:
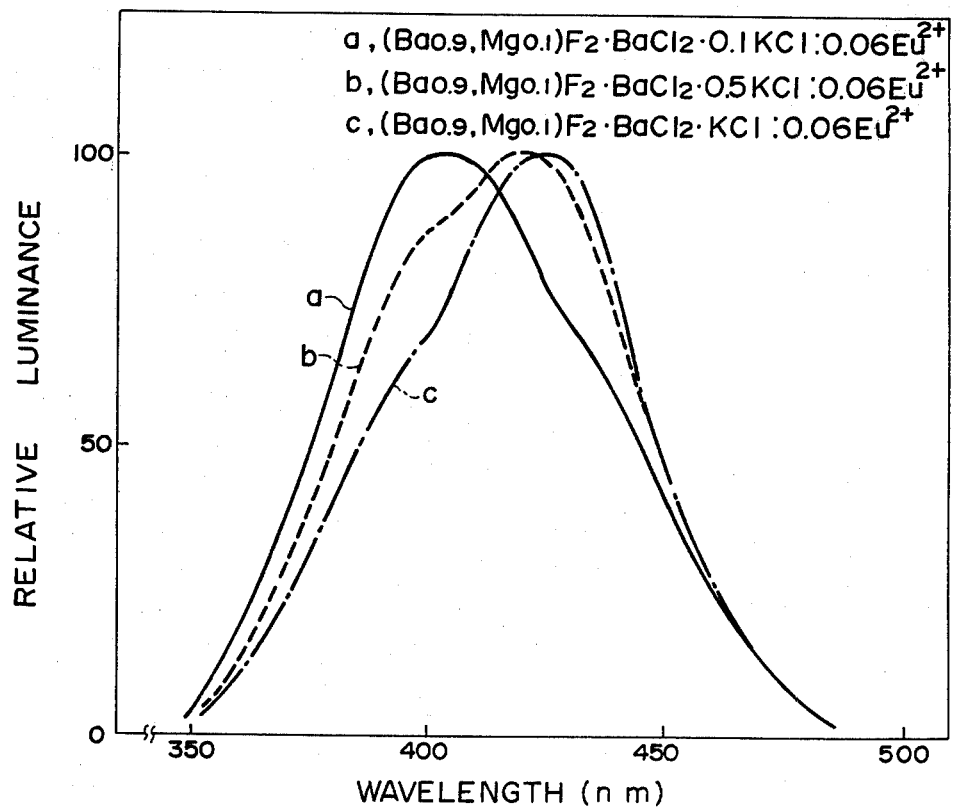

FIGS. 13 and 14 illustrate the emission spectra of various types of phosphor-V. FIG. 13 is a graph showing the emission spectra of the phosphor-V when the amount of KX' ($b_5$ value) is kept constant and the amount of Mg ($f_5$ value) is changed and FIG. 14 is a graph showing the emission spectra of the phosphor-V when the amount of Mg ($f_5$ value) is kept constant and the amount of KX' ($b_5$ value) is changed. As is clear from FIGS. 13 and 14, phosphor-V exhibits near ultraviolet to blue emission and with the increase of the amounts of Mg ($f_5$ value) and KX' ($b_5$ value) which are components of the host material of the phosphor, blue emission increases gradually. Although FIGS. 13 and 14 are graphs showing the emission spectra of the $(Ba_{1-f_5}, Mg_{f_5})F_2 \cdot BaCl_2 \cdot b_5 KCl : 0.06Eu^{2+}$ phosphors under X-ray excitation, it has also been confirmed that in the case of the phosphors of the same type as above having different composition formulae than the aforesaid formula or in the case of excitation by ultraviolet ray and cathode ray, with the increase of the amounts of Mg and KX' which are components of the host material, blue emission increases gradually.

As stated in above sections i) to v), the complex halide phosphors of this invention exhibit highly efficient emission under X-ray, ultraviolet ray and cathode ray excitation and their emission efficiency is the same as or higher than the emission efficiency of the conventional $Eu^{2+}$ activated alkaline earth metal fluorohalide phosphor of this invention in combination with regular type X-ray films under X-ray excitation and the luminances thereof by ultraviolet ray and cathode ray excitation. In the table, the speeds and the luminances thereof are shown by relative values with those of the $CaWO_4$ phosphor defined to be 100.

Table 2

| Phosphor | X-ray excitation (tube voltage 80 KVp) radiographic speed | Ultraviolet ray excitation (253.7nm) luminance | Electron beam excitation (acceleration voltage 20 KVp current density $1\mu A/cm^2$) luminance |
|---|---|---|---|
| $CaWO_4$ ($P_5$-$B_3$ made by Dai Nippon Toryo Co., Ltd.) | 100 | 100 | 100 |
| $BaF_2 \cdot BaCl_2:0.06Eu^{2+}$ | 330 | 30 | 40 |
| $BaF_2 \cdot BaBr_2:0.06Eu^{2+}$ | 350 | 30 | 40 |
| $SrF_2 \cdot SrCl_2:0.06Eu^{2+}$ | 250 | 30 | 40 |
| $SrF_2 \cdot SrBr_2:0.06Eu^{2+}$ | 280 | 30 | 40 |
| $CaF_2 \cdot SrCl_2:0.06Eu^{2+}$ | 100 | 60 | 80 |
| Phosphor-I | | | |
| $BaF_2 \cdot BaCl_2 \cdot 0.2KCl:0.06Eu^{2+}$ | 360 | 300 | 280 |
| $BaF_2 \cdot BaCl_2 \cdot 0.5KCl:0.06Eu^{2+}$ | 350 | 320 | 300 |
| $BaF_2 \cdot BaCl_2 \cdot KCl:0.06Eu^{2+}$ | 330 | 320 | 280 |
| $BaF_2 \cdot 1.2BaCl_2 \cdot 0.5KCl:0.06Eu^{2+}$ | 350 | 320 | 250 |
| $BaF_2 \cdot BaBr_2 \cdot 0.4KBr:0.06Eu^{2+}$ | 360 | 300 | 280 |
| $(Ba_{0.5},Sr_{0.5})F_2 \cdot (Ba_{0.5},Sr_{0.5})Cl_2 \cdot 0.2KCl:0.06Eu^{2+}$ | 300 | 250 | 250 |
| $BaF_2 \cdot SrBr_2 \cdot 0.2KBr:0.06Eu^{2+}$ | 330 | 300 | 280 |
| $SrF_2 \cdot 1.1SrCl_2 \cdot KCl:0.06Eu^{2+}$ | 270 | 300 | 300 |
| $SrF_2 \cdot 0.9SrBr_2 \cdot 0.5KBr:0.06Eu^{2+}$ | 270 | 250 | 280 |
| $BaF_2 \cdot (Ba_{0.6},Ca_{0.4})Cl_2 \cdot 0.5KCl:0.06Eu^{2+}$ | 240 | 300 | 250 |
| $CaF_2 \cdot CaCl_2 \cdot 0.2KCl:0.06Eu^{2+}$ | 90 | 300 | 200 |
| Phosphor-II | | | |
| $SrF_2 \cdot SrCl_2 \cdot 0.5KCl \cdot 0.2SrSO_4:0.06Eu^{2+}$ | 270 | 300 | 300 |
| $SrF_2 \cdot SrBr_2 \cdot KBr \cdot 0.4SrSO_4:0.06Eu^{2+}$ | 270 | 250 | 280 |
| $BaF_2 \cdot BaCl_2 \cdot 0.5KCl \cdot 0.2BaSO_4:0.06Eu^{2+}$ | 350 | 320 | 280 |
| $BaF_2 \cdot BaCl_2 \cdot KCl \cdot 0.2BaSO_4:0.06Eu^{2+}$ | 330 | 320 | 300 |
| $BaF_2 \cdot BaCl_2 \cdot 1.5KCl \cdot 0.2BaSO_4:0.06Eu^{2+}$ | 330 | 330 | 300 |
| $BaF_2 \cdot 1.2BaBr_2 \cdot 0.5KBr_4 \cdot 0.2BaSO_4:0.06Eu^{2+}$ | 360 | 300 | 280 |
| $BaF_2 \cdot BaBr_2 \cdot 0.5KBr \cdot 0.5KBr \cdot 0.6BaSO_4:0.06Eu^{2+}$ | 360 | 300 | 280 |
| $BaF_2 \cdot 0.8BaCl_2 \cdot KCl \cdot 0.4SrSO_4:0.06Eu^{2+}$ | 330 | 300 | 280 |
| $BaF_2 \cdot BaBr_2 \cdot 0.5KCl \cdot 0.2SrSO_4:0.06Eu^{2+}$ | 360 | 300 | 280 |
| $BaF_2 \cdot BaCl_2 \cdot KCl \cdot 0.2SrSO_4:0.06Eu^{2+}$ | 300 | 250 | 250 |
| $(Ba_{0.6},Ca_{0.4})F_2 \cdot SrCl_2 \cdot 0.5KCl \cdot 0.3BaSO_4:0.06Eu^{2+}$ | 240 | 300 | 250 |
| Phosphor III | | | |
| $BaF_2 \cdot BaCl_2:0.04Eu^{2+},0.002Tb^{3+}$ | 400 | 60 | 80 |
| $BaF_2 \cdot BaCl_2:0.04Eu^{2+},0.02Tb^{3+}$ | 380 | 120 | 150 |
| $BaF_2 \cdot BaBr_2:0.04Eu^{2+},0.002Tb^{3+}$ | 420 | 80 | 120 |
| $BaF_2 \cdot BaBr_2:0.04Eu^{2+},0.02Tb^{3+}$ | 380 | 150 | 180 |
| $SrF_2 \cdot SrCl_2:0.04Eu^{2+},0.002Tb^{3+}$ | 360 | 60 | 80 |
| $SrF_2 \cdot SrBr_2:0.04Eu^{2+},0.002Tb^{3+}$ | 390 | 90 | 140 |
| Phosphor IV | | | |
| $(Ba_{0.99},Mg_{0.01})F_2 \cdot BaCl_2:0.06Eu^{2+}$ | 360 | 80 | 80 |
| $(Ba_{0.95},Mg_{0.05})F_2 \cdot BaCl_2:0.06Eu^{2+}$ | 400 | 100 | 120 |
| $(Ba_{0.9},Mg_{0.1})F_2 \cdot BaCl_2:0.06Eu^{2+}$ | 400 | 110 | 150 |
| $(Ba_{0.75},Mg_{0.25})F_2 \cdot BaCl_2:0.06Eu^{2+}$ | 380 | 130 | 150 |
| $(Ba_{0.5},Mg_{0.5})F_2 \cdot BaCl_2:0.06Eu^{2+}$ | 340 | 150 | 160 |
| $(Ba_{0.3},Mg_{0.7})F_2 \cdot BaCl_2:0.06Eu^{2+}$ | 200 | 180 | 180 |
| $MgF_2 \cdot BaCl_2:0.06Eu^{2+}$ | 120 | 200 | 200 |
| $(Ba_{0.95},Mg_{0.05})F_2 \cdot BaBr_2:0.06Eu^{2+}$ | 420 | 110 | 90 |
| $MgF_2 \cdot BaBr_2:0.06Eu^{2+}$ | 150 | 200 | 200 |
| $(Sr_{0.9},Mg_{0.1})F_2 \cdot SrCl_2:0.06Eu^{2+}$ | 320 | 90 | 80 |
| $(Sr_{0.95},Mg_{0.05})F_2 \cdot SrBr_2:0.06Eu^{2+}$ | 350 | 100 | 80 |
| $(Sr_{0.5},Mg_{0.5})F_2 \cdot SrBr_2:0.06Eu^{2+}$ | 250 | 170 | 180 |
| $(Sr_{0.9},Mg_{0.1})F_2 \cdot BaBr_2:0.06Eu^{2+}$ | 380 | 90 | 90 |
| Phosphor V | | | |
| $(Ba_{0.99},Mg_{0.01})F_2 \cdot BaCl_2 \cdot 0.5KCl:0.06Eu^{2+}$ | 380 | 100 | 100 |
| $(Ba_{0.95},Mg_{0.05})F_2 \cdot BaCl_2 \cdot 0.5KCl:0.06Eu^{2+}$ | 420 | 150 | 160 |
| *$(Ba_{0.95},Mg_{0.05})F_2 \cdot BaCl_2 \cdot 0.01KCl:0.06Eu^{2+}$ | 430 | 120 | 150 |
| $(Ba_{0.9},Mg_{0.1})F_2 \cdot BaCl_2 \cdot 0.5KCl:0.06Eu^{2+}$ | 420 | 200 | 190 |
| $(Ba_{0.5},Mg_{0.5})F_2 \cdot 0.5KCl:0.06Eu^{2+}$ | 360 | 200 | 190 |
| $MgF_2 \cdot 0.5KCl:0.06Eu^{2+}$ | 120 | 200 | 200 |
| $(Ba_{0.95},Mg_{0.05})F_2 \cdot BaBr_2 \cdot KBr:0.06Eu^{2+}$ | 440 | 200 | 180 |
| *$(Ba_{0.95},Mg_{0.05})F_2 \cdot BaBr_2 \cdot 0.03KBr:0.06Eu^{2+}$ | 450 | 150 | 150 |
| $(Ba_{0.9},Mg_{0.1})F_2 \cdot BaBr_2 \cdot KBr:0.06Eu^{2+}$ | 440 | 220 | 200 |
| $(Sr_{0.9},Mg_{0.1})F_2 \cdot SrCl_2 \cdot 0.5KBr:0.06Eu^{2+}$ | 340 | 180 | 190 |
| $(Sr_{0.95},Mg_{0.05})F_2 \cdot BaBr_2 \cdot 0.5KBr:0.06Eu^{2+}$ | 400 | 170 | 190 |
| $(Sr_{0.95},Mg_{0.05})F_2 \cdot SrBr_2 \cdot KBr:0.06Eu^{2+}$ | 340 | 200 | 200 |

*This phosphor was obtained by once washing the phosphor directly above with cold water at a rate of 1 liter per 200g of the phosphor after firing.

Table 2 shows the speeds of the $CaWO_4$ phosphor, the $Eu^{2+}$ activated alkaline earth metal fluorohalide phosphor disclosed in Japanese Patent Public Disclosure No. 42,582/1974 and the complex halide phosphors of this invention in combination with regular type X-ray films under X-ray excitation and the luminances thereof by ultraviolet ray and cathode ray excitation. In the As is clear from Table 2, the speed of the complex halide phosphors of this invention in combination with a regular type X-ray film under X-ray excitation is same as or faster than that of the conventional $Eu^2$ + activated alkaline earth metal fluorohalide phosphor and is far higher than that of the $CaWO_4$ phosphor long known as an X-ray phosphor. The aforesaid facts mean that the complex halide phosphors of this invention exhibit highly efficient emission under X-ray excitation and the emission spectra of the phosphors of this invention coincide with the spectral sensitivity of a regular type X-ray film. Moreover, as is also clear from Table 2, the complex halide phosphors of this invention exhibit far higher luminance than those of the $CaWO_4$ phosphor and the conventional $Eu^{2+}$ activated alkaline earth metal fluorohalide phosphor under ultraviolet ray and cathode ray excitation. The reasons why the complex halide phosphors of this invention exhibit such a far higher luminance than those of the conventional $Eu^{2+}$ activated alkaline earth metal fluorohalide phosphor under ultraviolet ray and cathode ray excitation are;

(1) in phosphor-I, the emission in the blue region is enhanced by the use of KX'in addition to $MeF_2$ and $ME'X_2$ as components of the host material, (2) in phosphor-II, the emission in the blue region is enhanced by the use of KX'and Me"$SO_4$ in addition to $MeF_2$ and $Me'X_2$ as components of the host material, (3) in phosphor-III, the emission in the near ultraviolet region by $Eu^{2+}$ is sensitized and at the same time the emission of green region by $tb^{3+}$ is enhanced by the use of $Tb^{3+}$ in addition to $Eu^{2+}$ as the activator, (4) in phosphor-IV, the emission in the blue region is enhanced by the use of $MgF_2$ and in addition to $MeF_2$ and $Me+X_2$ as components of the host material, and (5) in phosphor-V, the emission in the blue region is enhanced by the use of $MgF_2$ and KX in addition to $MeF_2$ and $Me'X_2$ as components of the host material.

Moreover, phosphor-I, phosphor-II and phosphor-V among the complex halide phosphors of this invention have shorter afterglow under X-ray, ultraviolet ray and cathode ray excitation than the conventional $Eu^{2+}$ activated alkaline earth metal fluorohalide phosphor.

Table 3 shows the afterglow characteristics of the $CaWO_4$ phosphor, the $Eu^{2+}$ activated alkaline earth metal fluorohalide phosphor disclosed in Japanese Patent Public Disclosure No. 42,582/1974, and also phosphor-I, phosphor-II and phosphor-V of this invention under X-ray, ultraviolet ray and cathode ray excitation. In the table, the afterglow characteristics are shown by 1/10 decay time.

Table 3

| Phosphor | X-ray excitation (tube voltage 80 KVp) 1/10 decay time (msec) | Ultraviolet ray excitation (253.7nm) 1/10 decay time (msec) | Electron beam excitation (acceleration voltage 20 KVp current density 1μA/cm$^2$) 1/10 decay time (msec) |
|---|---|---|---|
| $CaWO_4$ ($P_5$-$B_3$ made by Dai Nippon Toryo Co., Ltd.) | 1 | 5 | 1 |
| $BaF_2 \cdot BaCl_2$:0.06$Eu^{2+}$ | 20 | 70 | 25 |
| $BaF_2 \cdot BaBr_2$:0.06$Eu^{2+}$ | 25 | 70 | 30 |
| $SrF_2 \cdot SrCl_2$:0.06$Eu^{2+}$ | 10 | 30 | 8 |
| $CaF_2 \cdot SrCl_2$:0.06$Eu^{2+}$ | 8 | 30 | 8 |
| Phosphor I | | | |
| $BaF_2 \cdot BaCl_2 \cdot$ 0.2KCl:0.06$Eu^{2+}$ | 2 | 15 | 5 |
| $BaF_2 \cdot BaCl_2 \cdot$ 0.5KCl:0.06$Eu^{2+}$ | 1.5 | 12 | 3 |
| $BaF_2 \cdot BaCl_2 \cdot$ KCl:0.06$Eu^{2+}$ | 1 | 10 | 2 |
| $BaF_2 \cdot$ 1.2$BaCl_2 \cdot$ 0.5KCl:0.06$Eu^{2+}$ | 1.5 | 10 | 2.5 |
| $BaF_2 \cdot BaBr_2 \cdot$ 0.4KBr:0.06$Eu^{2+}$ | 3 | 20 | 8 |
| $(Ba_{0.5},Sr_{0.5})F_2 \cdot (Ba_{0.5},Sr_{0.5})Cl_2 \cdot$ 0.2KCl:0.06Eu | 3 | 20 | 7 |
| $BaF_2 \cdot SrBr_2 \cdot$ 0.2KBr:0.06$Eu^{2+}$ | 1.5 | 20 | 6 |
| $SrF_2 \cdot$ 1.1$SrCl_2 \cdot$KCl:0.06$Eu^{2+}$ | 1 | 10 | 3 |
| $SrF_2 \cdot$ 0.9$SrBr_2 \cdot$ 0.5KBr:0.06$Eu^{2+}$ | 2 | 15 | 6 |
| $BaF_2$ $(Ba_{0.6},Ca_{0.4})Cl_2 \cdot$ 0.5KCl:0.06$Eu^{2+}$ | 2 | 15 | 5 |
| $CaF_2$ $CaCl_2 \cdot$ 0.2KCl:0.06$Eu^{2+}$ | 1 | 12 | 5 |
| Phosphor-II | | | |
| $SrF_2 \cdot SrCl_2$ 0.5KCl $\cdot$ 0.2$SrSO_4$:0.06$Eu^{2+}$ | 1 | 10 | 3 |
| $SrF_2 \cdot SrBr_2 \cdot$ KBr $\cdot$ 0.4$SrSO_4$:0.06$Eu^{2+}$ | 2 | 15 | 6 |
| $BaF_2 \cdot BaCl_2 \cdot$ 0.5KCl $\cdot$ 0.2$BaSO_4$:0.06$Eu^{2+}$ | 2 | 15 | 3 |
| $BaF_2 \cdot BaCl_2 \cdot$ KCl $\cdot$ 0.2$BaSO_4$:0.06$Eu^{2+}$ | 1.5 | 12 | 3 |
| $BaF_2 \cdot BaCl_2 \cdot$ 1.5KCl $\cdot$ 0.2$BaSO_4$:0.06$Eu^{2+}$ | 1 | 10 | 2 |
| $BaF_2 \cdot$ 1.2$BaBr_2 \cdot$ 0.5KBr $\cdot$ 0.2$BaSO_4$:0.06$Eu^{2+}$ | 4 | 20 | 10 |
| $BaF_2 \cdot BaBr_2 \cdot$ 0.5KBr $\cdot$ 0.6$BaSO_4$:0.06$Eu^{2+}$ | 3 | 20 | 8 |
| $BaF_2 \cdot$ 0.8$BaCl_2 \cdot$ KCl $\cdot$ 0.4$SrSO_4$:0.06$Eu^{2+}$ | 3 | 20 | 6 |
| $BaF_2 \cdot BaBr_2 \cdot$ 0.5KCl $\cdot$ 0.2$SrSO_4$:0.06$Eu^{2+}$ | 3 | 20 | 5 |
| $BaF_2 \cdot BaCl_2 \cdot$ KCl $\cdot$ 0.2$SrSO_4$:0.06$Eu^{2+}$ | 2 | 20 | 7 |
| $(Ba_{0.6},Ca_{0.4})F_2 \cdot SrCl_2 \cdot$ 0.5KCl $\cdot$ 0.3$BaSO_4$:0.06$Eu^{2+}$ | 2 | 15 | 5 |
| Phosphor-V | | | |
| $(Ba_{0.99},Mg_{0.01})F_2 \cdot BaCl_2 \cdot$ 0.5KCl:0.06$Eu^{2+}$ | 0.5 | 8 | 0.5 |
| $(Ba_{0.95},Mg_{0.05})F_2 \cdot BaCl_2 \cdot$ 0.5KCl:0.06$Eu^{2+}$ | 0.5 | 8 | 0.5 |
| *$(Ba_{0.95},Mg_{0.05})F_2 \cdot BaCl_2 \cdot$ 0.01KCl:0.06$Eu^{2+}$ | 1.0 | 10 | 1.0 |
| $(Ba_{0.9},Mg_{0.1})F_2 \cdot BaCl_2 \cdot$ 0.5KCl:0.06$Eu^{2+}$ | 0.5 | 8 | 0.5 |
| $(Ba_{0.5},Mg_{0.5})F_2 \cdot BaCl_2 \cdot$ 0.5KCl:0.06$Eu^{2+}$ | 0.5 | 8 | 1.0 |
| $MgF_2 \cdot BaCl_2 \cdot$ 0.5KCl:0.06$Eu^{2+}$ | 2.0 | 12 | 3.0 |
| $(Ba_{0.95},Mg_{0.05})F_2 \cdot BaBr_2 \cdot$ KBr:0.06$Eu^{2+}$ | 1.0 | 10 | 1.5 |
| *$(Ba_{0.95},Mg_{0.05})F_2 \cdot BaBr_2 \cdot$ 0.03KBr:0.06$Eu^{2+}$ | 1.5 | 12 | 2.0 |
| $(Ba_{0.9},Mg_{0.1})F_2 \cdot BaBr_2 \cdot$ KBr:0.06$Eu^{2+}$ | 1.0 | 10 | 1.0 |
| $(Sr_{0.9},Mg_{0.1})F_2 \cdot SrCl_2 \cdot$ 0.5KBr:0.6$Eu^{2+}$ | 0.5 | 7 | 0.5 |
| $(Sr_{0.95},Mg_{0.05})F_2 \cdot BaBr_2 \cdot$ 0.5KBr:0.06$Eu^{2+}$ | 1.0 | 10 | 1.5 |
| $(Sr_{0.95},Mg_{0.05})F_2 \cdot SrBr_2 \cdot$ KBr:0.06$Eu^{2+}$ | 1.0 | 10 | 1.0 |

*This phosphor was one obtained by once washing the phosphor directly above with cold water at a rate of 1 liter per 200g of the phosphor.

As is clear from Table 3, phosphor-I, phosphor-II and phosphor-V are superior to the conventional $Eu^{2+}$ activated alkaline earth metal fluorohalide phosphor in afterglow characteristics with respect to X-ray, ultraviolet ray and cathode ray excitation, that is, the aforesaid phosphors of this invention show a shorter afterglow time. The above mentioned facts show that these complex halide phosphors of this invention exhibit highly efficient emission under X-ray, ultraviolet ray and cathode ray excitatio and they have high utility as phosphors for X-ray image converters, fluorescent lamps and cathode ray tubes.

In addition, the afterglow characteristics of phosphor III and phosphor-IV are almost the same as those of the conventional $Eu^{2+}$ activated alkaline earth metal fluorohalide phosphors.

As stated above, the complex halide phosphors of this invention exhibit highly efficient near ultraviolet to blue emission (phosphor-I, phosphor-II, phosphor-IV and phosphor-V) or highly efficient near ultraviolet to green emission (phosphor-III) under X-ray, ultraviolet ray and cathode ray excitation, also exhibit excellent afterglow characteristics (phosphor-I, phosphor-II and phosphor-V), and are excellent as phosphors for X-ray image converters, fluorescent lamps and cathode ray tubes.

Next, X-ray image converters having fluorescent layers composed of the complex halide phosphors will be explained below in detail.

The general public has in recent years become increasingly aware of the danger of X-rays as used in medical diagnosis and a strong need is felt for finding ways to reduce the patient dose. If the phosphors used for X-ray image converters are to contribute to reducing the patient dose, they must show good X-ray absorption and highly efficient emission under X-ray excitation. They are also required to show short afterglow and further, especially when used in a radiograph using X-ray films, are required to have emission spectra which coincide with the spectral sensitivity of X-ray films. Furthermore, the speed of the radiographic system composed of the combination of X-ray image converters must be high and the image quality excellent.

The complex halide phosphors of this invention are suitable as phosphors for X-ray image converters since they show comparatively good X-ray absorption due to the presence of alkaline earth metals having good X-ray absorption contained therein, they exhibit a highly efficient emission under X-ray excitation as described earlier, and, in particular, they show short afterglow in the case of phosphor-I, phosphor-II and phosphor-V. Furthermore, the complex halide phosphors of this invention are also suitable as phosphors for X-ray image converters, in particular as phosphors for intensifying screens and fluorescent screens for radiography since the emission spectra thereof coincide with the spectral sensitivity of a regular type X-ray film and since the image quality formed is excellent.

An intensifying screen and a fluorescent screen are fundamentally composed of a support such as a sheet, a plastic film etc., and a fluorescent layer formed on one surface of the support. The fluorescent layer is a dispersion of a phosphor in a resinous binder and in the intensifying screen, the surface of the fluorescent layer (the surface thereof opposite to the support side) is generally protected by a transparent protective layer such as a polyethylene terephthalate layer etc. Furthermore, the intensifying screen generally has a reflective layer or an absorptive layer formed between the support and the fluorescent layer and further in intensifying screens used for industrial radiography for the nondestructive inspection of materials, a metal foil is formed between the support and the fluorescent layer.

Table 4 shows the speed, the sharpness and the film density of afterglow by an accelerated test of the intensifying screens of this invention using the complex halide phosphors of this invention together with those of the conventionally used intensifying screens using the $CaWO_4$ phosphor and the intensifying screens using the conventional $Eu^{2+}$ activated alkaline earth metal fluorohalide phosphor for the sake of comparison. The speed shown in the table is one when the intensifying screen is combined with a regular type X-ray film at an X-ray tube voltage of 80KVp and is shown by a relative value when the speed of a high sharpness type intensifying screen using the $CaWO_4$ phosphor is defined as 100. The sharpness is shown by the MTF value at a spatial frequency of 2.0 lines/mm. By "film density of afterglow by an accelerated test" is meant the density when the intensifying screen is first exposed to X-rays for 90 seconds under an X-ray tube voltage of 65KVp and an X-ray tube current of 3 mA and then, after 1 second, is closely brought into contact with a regular type X-ray film, the screen and the film being allowed to stand in contact for 30 minutes before the photographic film is developed. The larger the film density value is, the longer the afterglow is.

The intensifying screens using the $CaWO_4$ phosphor used in this experiment were commercially available intensifying screens sold under the tradenames of FS, MS and HS and made by Dai Nippon Toryo Co., Ltd. The intensifying screens using the conventional $Eu^{2+}$ activated alkaline earth metal fluorohalide phosphor and the intensifying screens using the complex halide phosphors of this invention each had between the support and the fluorescent layer an absorptive layer of carbon black powder dispersed in a resinous binder, the mean grain size of the phosphors used was $5.0\mu$in each case, and the standard deviation ($\log \sigma$) was 0.40 in the conventional $Eu^{2+}$ activated alkaline earth metal fluorohalide phosphor and phosphor-I, phosphor-II and phosphor-V of this invention and was 0.45 in phosphor-III and phosphor-IV of this invention. The coating weight of the phosphor was $50mg/cm^2$ in the case of using phosphor-I and phosphor-II, $30mg/cm^2$ in the case of using phosphor-III, phosphor-IV and phosphor-V, and was $50mg/cm^2$ and $30mg/cm^2$ in the case of using the conventional $Eu^{2+}$ activated alkaline earth metal fluorohalide phosphor.

Table 4

| Intensifying Screen | Speed (relative value) | Sharpness (MTF value) | Film density of afterglow by accelerated test (D) |
|---|---|---|---|
| high sharpness type $CaWO_4$ (FS made by Dai Nippon Toryo Co., Ltd.) | 100 | 0.55 | 0.5 |
| medium type $CaWO_4$ (MS made by Dai Nippon Toryo Co., Ltd.) | 160 | 0.47 | 0.5 |
| high speed type $CaWO_4$ (HS made by Dai Nippon Toryo Co., Ltd.) | 240 | 0.37 | 0.6 |
| $BaF_2 \cdot BaCl_2:0.06Eu^{2+}$ | | | |

Table 4-continued

| Intensifying Screen | Speed (relative value) | Film density of Sharpness (MTF value) | afterglow by accelerated test (D) |
|---|---|---|---|
| (coating weight 50 mg/cm$^2$) $BaF_2 \cdot BaCl_2:0.06Eu^{2+}$ | 550 | 0.42 | 1.7 |
| (coating weight 30 mg/cm$^2$) | 330 | 0.45 | 1.7 |
| Phosphor-I | | | |
| $BaF_2 \cdot BaCl_2 \cdot 0.5KCl:0.06Eu^{2+}$ | 580 | 0.45 | 0.6 |
| $BaF_2 \cdot 1.1BaCl_2 \cdot KCl:0.06Eu^{2+}$ | 580 | 0.45 | 0.5 |
| $BaF_2 \cdot 1.2BaBr_2 \cdot 0.4KBr:0.06Eu^{2+}$ | 600 | 0.45 | 0.8 |
| $SrF_2 \cdot 1.1SrCl_2 \cdot KCl:0.06Eu^{2+}$ | 450 | 0.42 | 0.6 |
| $BaF_2 \cdot (Ba_{0.6},Ca_{0.4})Cl_2 \cdot 0.2KCl:0.06Eu^{2+}$ | 400 | 0.45 | 0.6 |
| Phosphor-II | | | |
| $SrF_2 \cdot SrCl_2 \cdot 0.5KCl \cdot 0.2SrSO_4:0.06 Eu^{2+}$ | 450 | 0.55 | 0.5 |
| $BaF_2 \cdot BaCl_2 \cdot 0.5KCl \cdot 0.5KCl \cdot 0.2BaSO_4:0.06Eu^{2+}$ | 580 | 0.53 | 0.6 |
| $BaF_2 \cdot BaCl_2 \cdot KCl \cdot 0.4BaSO_4:0.06Eu^{2+}$ | 550 | 0.55 | 0.6 |
| $BaF_2 \cdot BaCl_2 \cdot 1.5KCl \cdot 0.1BaSO_4:0.06Eu^{2+}$ | 550 | 0.55 | 0.5 |
| $BaF_2 \cdot BaBr_2 \cdot 0.5KBr \cdot 0.6BaSO_4:0.06Eu^{2+}$ | 600 | 0.50 | 0.8 |
| $BaF_2 \cdot SrCl_2 \cdot KCl \cdot 0.02SrSO_4:0.06Eu^{2+}$ | 500 | 0.54 | 0.5 |
| $(Ba_{0.6},Ca_{0.4})F_2 \cdot SrCl_2 \cdot 0.5KCl \cdot 0.3BaSO_4:0.06Eu^{+}$ | 400 | 0.54 | 0.6 |
| Phosphor-III | | | |
| $BaF_2 \cdot BaCl_2:0.05Eu^{2+},0.002Tb^{3+}$ | 400 | 0.48 | 1.6 |
| $BaF_2 \cdot BaCl_2:0.4Eu^{2+},0.02Tb^{3+}$ | 390 | 0.49 | 1.5 |
| $BaF_2 \cdot BaBr_2:0.04Eu^{2+},0.002Tb^{3+}$ | 420 | 0.47 | 1.7 |
| $BaF_2 \cdot BaBr_2:0.04Eu^{2+},0.02Tb^{3+}$ | 400 | 0.48 | 1.6 |
| $SrF_2 \quad SrCl_2:0.04Eu^{2+},0.002Tb^{3+}$ | 370 | 0.47 | 1.6 |
| $SrF_2 \cdot SrBr_2:0.04Eu^{2+},0.002Tb^{3+}$ | 390 | 0.47 | 1.7 |
| Phosphor-IV | | | |
| $(Ba_{0.99},Mg_{0.01})F_2 \cdot BaCl_2:0.06Eu^{2+}$ | 360 | 0.51 | 1.5 |
| $(Ba_{0.95},Mg_{0.05})F_2 \cdot BaCl_2:0.06Eu^{2+}$ | 400 | 0.53 | 1.5 |
| $(Ba_{0.09},Mg_{0.1})F_2 \cdot BaCl_2:0.06Eu^{2+}$ | 400 | 0.53 | 1.4 |
| $(Ba_{0.95},Mg_{0.05})F_2 \cdot BaBr_2:0.06Eu^{2+}$ | 420 | 0.52 | 1.6 |
| $(Sr_{0.95},Mg_{0.05})F_2 \cdot SrBr_2:0.06Eu^{2+}$ | 360 | 0.49 | 1.4 |
| Phosphor-V | | | |
| $(Ba_{0.99},Mg_{0.01})F_2 \cdot BaCl_2 \cdot 0.5KCl:0.06Eu^{2+}$ | 380 | 0.55 | 0.5 |
| $(Ba_{0.95},Mg_{0.05})F_2 \cdot BaCl_2 \cdot 0.5KCl:0.06Eu^{2+}$ | 420 | 0.54 | 0.6 |
| *$(Ba_{0.95},Mg_{0.05})F_2 \cdot BaCl_2 \cdot BaCl_2 \cdot 0.01KCl:0.06Eu^{2+}$ | 430 | 0.54 | 0.7 |
| $(Ba_{0.09},Mg_{0.1})F_2 \cdot BaCl_2 \cdot 0.5KCl:0.06Eu^{2+}$ | 420 | 0.54 | 0.6 |
| $(Ba_{0.5},Mg_{0.5})F_2 \cdot BaCl_2 \cdot 0.5KCl:0.06Eu^{2+}$ | 330 | 0.55 | 0.5 |
| $(Sr_{0.9},Mg_{0.1})F_2 \cdot SrCl_2 \cdot 0.5KCl:0.06Eu^{2+}$ | 340 | 0.55 | 0.5 |
| $(Ba_{0.95},Mg_{0.05})F_2 \cdot BaBr_2 \cdot KBr:0.06Eu^{2+}$ | 440 | 0.52 | 0.7 |
| *$(Ba_{0.95},Mg_{0.05})F_2 \cdot BaBr_2 \cdot 0.03KBr:0.06Eu^{2+}$ | 450 | 0.52 | 0.8 |
| $(Sr_{0.95},Mg_{0.05})F_2 \cdot BaBr_2 \cdot 0.5KBr:0.06Eu^{2+}$ | 400 | 0.52 | 0.6 |
| $(Sr_{0.9},Mg_{0.1})F_2 \cdot SrBr_2 \cdot KBr:0.06Eu^{2+}$ | 340 | 0.53 | 0.6 |

*The phosphor used in this intensifying screen was one obtained by once washing the phosphor used in the intensifying screen directly above with cold water at a rate of 1 liter per 200g of the latter phosphor.

As is clear from the comparison results of intensifying screens (the comparison of the intensifying screen of this invention and the intensifying screen using the conventional $Eu^{2+}$ activated alkaline earth metal fluorohalide phosphor was, of course, performed in respect of intensifying screens whose coats had the same amount of phosphor) shown in Table 4, the intensifying screens using phosphor-I of this invention have a speed almost the same as that of the intensifying screen using the conventional $Eu^{2+}$ activated alkaline earth metal fluorohalide phosphor and much faster than that of the intensifying screen using the $CaWO_4$ phosphor. Further, this intensifying screen has the sharpnes almost the same as that of the intensifying screen using the conventional $Eu^{2+}$ activated alkaline earth metal fluorohalide phosphor. Although the sharpness of the intensifying screens of this invention may be inferior to the conventional high sharpness type intensifying screen using the $CaWO_4$ phosphor, it is superior to the high speed type intensifying screen using the $CaWO_4$ phosphor and is almost the same as that of a medium speed type intensifying screen using the $CaWO_4$ phosphor.

Also, the intensifying screens using phosphor-II of this invention have a speed almost the same as or faster than that of the intensifying screen using the conventional $Eu^{2+}$ activated alkaline earth metal fluorohalide phosphor and have a far faster speed than that of the intensifying screen using the $CaWO_4$ phosphor. The intensifying screens using phosphor-II of this invention have superior sharpness to the intensifying screen using the conventional $Eu^{2+}$ activated alkaline earth metal fluorohalide phosphor and further their sharpness is almost the same as that of the conventional high sharpness type intensifying screen using the $CaWO_4$ phosphor.

Furthermore, the intensifying screens using phosphor-III of this invention have a speed almost the same as or higher than that of the intensifying screens using the conventional $Eu^{2+}$ activated alkaline earth metal fluorohalide phosphor and also a far higher speed than that of the intensifying screen using the $CaWO_4$ phosphor. Also, the intensifying screens using phosphor-III have a sharpness almost the same as that of the intensifying screen using the conventional $Eu^{2+}$ activated alkaline earth metal fluorohalide phosphor and, although the sharpness thereof may be inferior to that of the conventional high sharpness type intensifying screen using the $CaWO_4$ phosphor, it is superior to that of the high speed type intensifying screen using the $CaWO_4$ phosphor and is almost the same as that of the medium speed type intensifying screen using the $CaWO_4$ phosphor.

Moreover, the intensifying screens using phosphor-IV of this invention have a speed the same as or higher than that of the intensifying screen using the conventional $Eu^{2+}$ activated alkaline earth metal fluorohalide phosphor and have also a far higher speed than that of the intensifying screen using the CaWO$_4$ phosphor.

Also, the intensifying screens using phosphor-IV have a sharpness superior to that of the intensifying screen using the conventional Eu$^{2+}$ activated alkaline earth metal fluorohalide phosphor and although the sharpness thereof may be inferior to that of the conventional high sharpness type intensifying screen using the CaWO$_4$ phosphor, it is superior to that of the high speed type intensifying screens using the CaWO$_4$ phosphor and that of the medium speed type intensifying screen using the CaWO$_4$ phosphor, and lies between the sharpness of the medium speed type intensifying screen using the CaWO$_4$ phosphor and the sharpness of the high sharpness type intensifying screen using the CaWO$_4$ phosphor.

Furthermore, the intensifying screens using phosphor-V of this invention have a speed the same as or higher than that of the intensifying screen using the conventional Eu$^{2+}$ activated alkaline earth metal fluorohalide phosphor and have a far higher speed than that of the intensifying screen using the CaWO$_4$ phosphor.

Also, the intensifying screens using phosphor-V have a sharpness superior to that of the intensifying screen using the conventional Eu$^{2+}$ activated alkaline earth metal fluorohalide phosphor and the sharpness thereof is the same as that of the conventional high sharpness type intensifying screen using the CaWO$_4$ phosphor or lies between the sharpness of the conventional high sharpness type screen and that of the medium speed type intensifying screen using the CaWO$_4$ phosphor, and is superior to that of the high speed type intensifying screen using the CaWO$_4$ phosphor and that of the medium speed type intensifying screen using the CaWO$_4$ phosphor.

As stated above, the intensifying screens using the complex halide phosphors of this invention have a sharpness of the same level as that of the conventional intensifying screens using CaWO$_4$ phosphor but, as is clear from Table 4, the higher the speed of an intensifying screen, the lower its sharpness generally is, and hence in order to obtain intensifying screens having high speed, it is, in the conventional technique, necessary to make a considerable sacrifice of sharpness. However, the intensifying screens of this invention are superior in sharpness to at least the conventional high speed type intensifying screens using CaWO$_4$ phosphor and are also far superior in speed to these conventional high speed type intensifying screens.

Furthermore, as is clear from Table 4, the intensifying screens using phosphor-I, the intensifying screens using phosphor II, and the intensifying screens using phosphor-V show remarkably low film density of afterglow by an accelerated test as compared with that of the intensifying screen using the Eu$^{2+}$ activated alkaline earth metal fluorohalide phosphor and further the film density values of the intensifying screens of this invention are almost the same as that of the intensifying screen using the CaWO$_4$ phosphor.

As stated above, the sharpness of the intensifying screens of this invention is on the same level as that of the intensifying screens using the CaWO$_4$ phosphor and the speed of the intensifying screens of this invention is almost the same as or faster than that of the intensifying screen using the conventional Eu$^{2+}$ activated alkaline earth metal fluorohalide phosphor and is far superior to the intensifying screen using the CaWO$_4$ phosphor.

Moreover, the afterglow characteristics of the intensifying screens using phosphor-I, the intensifying screens using phosphor-II and the intensifying screens using phosphor-V among the intensifying screens of this invention are in particular greatly superior to those of the intensifying screens using the conventional Eu$^{2+}$ activated alkaline earth metal fluorohalide phosphor and are on the same level as those of the intensifying screens using the CaWO$_4$ phosphor.

The structure of the intensifying screen of this invention is the same as that of conventional intensifying screens. That is, the intensifying screen of this invention is essentially composed of a support such as a sheet, plastic film etc., and a fluorescent layer of the complex halide phosphor dispersed in a resinous binder such as nitrocellulose etc., formed on the support. The fluorescent layer may be formed by a manner conventionally employed in the field of the art. Namely, the complex halide phosphor is mixed with a proper amount of a binder such as nitrocellulose and further a proper amount of a solvent is added to the mixture to form a dispersion of the phosphor having an optimum viscosity. The dispersion of the phosphor thus prepared is applied to a support by means of a roll coater, a knife coater etc., followed by drying to form a fluorescent layer. In addition, in the case that the intensifying screen has the structure having a reflective layer, an absorptive layer or a metal foil between the support and the fluorescent layer, the dispersion of the phosphor is applied to the reflective layer, absorptive layer or metal foil formed before hand on the surface of the support followed by drying to form the fluorescent layer. In this case, additives such as a dispersing agent for improving the dispersibility of the phosphor and a plasticizer, e.g., dibutyl phthalate, methylphthalyl ethyleneglycol, etc., may be added to the dispersion of the phosphor at the formation of the fluorescent layer.

In the intensifying screens of this invention, the proper amount of applied phosphor is 10–200mg/cm$^2$, preferably 20–150mg/cm$^2$. Also, the preferred means grain size of the phosphor used is 3–10$\mu$, more preferably 4–6$\mu$.

In general, intensifying screens have a transparent protective layer on the fluorescent layer thereof for protecting the fluorescent layer, and the intensifying screens of this invention may also have such a transparent protective layer for protecting mainly the fluorescent layer from moisture or water. In this invention, it is desirable to form the transparent protective layer of a gas impervious resin such as polyvinyl chloride, polyethylene, acrylic resin, etc.

The fluorescent screens of this invention using the complex halide phosphors of this invention also have speed, sharpness and afterglow characteristics as excellent as those of the intensifying screens of this invention. Also, in the case of using the complex halide phosphors of this invention as the fluorescent layers for intensifier tubes, the phosphors can be used not only as input fluorescent layers but also, with respect to phosphor-I, phosphor-II, phosphor-IV and phosphor-V as output fluorescent layers. That is, the input fluorescent layer composed of the complex phosphor of this invention exhibits highly efficient emission by input X-rays and emits photoelectrons from the photocathode. Also, the output fluorescent layer using phosphor-I, phosphor-II, phosphor-IV or phosphor-V exhibits highly efficient emission by photoelectrons converged by focus electrodes and accelerated by an anode to emit a blue visible image. In particular, in an X-ray television system, the emission from the intensifier tube is caught by a pick-up tube and the electric signal thereof is amplified and converted as images on a monitorring television tube and in this case, since the emission of the output fluorescent layer using phosphor-I, phosphor-II, phosphor-IV or phosphor-V coincides with the spectral sensitivity of the pick-up tube having blue sensitivity, the photoelectric conversion can be effectively performed in the case of using the output fluorescent layer of this invention.

As explained above, the complex halide phosphors of this invention exhibit highly efficient emission under X-ray, ultraviolet ray and cathode ray excitation, can be used as the fluorescent layers for X-ray image converters, fluorescent lamps, cathode ray tubes etc., and are particularly suitable as the fluorescent layers for X-ray image converters. Thus, the phosphors of this invention have a very large industrial utility value.

The invention will further be explained by the following examples.

| | |
|---|---|
| Strontium fluoride ($SrF_2$) | 125 g |
| Strontium chloride ($SrCl_2 \cdot 6H_2O$) | 293 g |
| Potassium chloride (KCl) | 74.5 g |
| Europium fluoride ($EuF_3$) | 12.5 g |

The raw material mixture described above was further mixed with 25g of $MgCl_2$ as a flux and the mixture was mixed well in a ball mill. The resultant mixture was placed in an alumina crucible and then fired for 3 hours at 700° C in a nitrogen atmosphere containing 2% hydrogen. After firing, the fired product was washed with acetone, dried and sieved to provide $SrF_2 \cdot 1.1SrCl_2 \cdot KCl:0.06Eu^{2+}$ phosphor (phosphor-I) having a mean grain size of 6.0μ and a standard deviation of 0.45. The phosphor thus prepared exhibited excellent emission characteristics as shown in Table 2 and Table 3 under X-ray, ultraviolet ray and cathode ray excitation.

EXAMPLE 2

In 5 liters of water was dissolved 269g of barium chloride ($BaCl_2 \cdot 2H_2O$) and to the $BaCl_2$ solution thus obtained was added a sodium fluoride (NaF) solution prepared by dissolving 46g of NaF in 1 liter of water. The white precipitates ($BaF_2 \cdot BaCl_2$) thus formed were recovered by filtration and dried at 100° C. Then, 19g of potassium chloride (KCl) was dissolved in 50ml of water and to the KCl solution prepared were added 15.5g of europium chloride ($EuCl_3$) and 192g of $BaF_2 \cdot BaCl_2$ obtained in the above procedure to form a pasty mixture, which was kneaded well and dried. To the raw material mixture thus prepared were added 11g of $MgCl_2$ and 11g of $NH_4Cl$ as fluxes and the resultant mixture was mixed well by means of a ball mill. The mixture thus obtained was placed in an alumina crucible and fired for 2 hours at 740° C in a nitrogen atmosphere containing 2% hydrogen. After firing, the fired product was washed with butyl acetate, dried, and sieved to provide the $BaF_2 \cdot BaCl_2 \cdot 0.5KCL: 0.06Eu^{2+}$ phosphor (phosphor-I) having a mean grain size of 5.0μ and a standard deviation of 0.40. The phosphor exhibited excellent emission characteristics as shown in Table 2 and Table 3.

EXAMPLE 3

| | |
|---|---|
| Barium fluoride ($BaF_2$) | 175.4 g |
| Barium chloride ($BaCl_2 \cdot 2H_2O$) | 244.6 g |
| Potassium chloride (KCl) | 37.3 g |
| Barium sulfate ($BaSO_4$) | 46.7 g |
| Europium chloride ($EuCl_3$) | 15.5 g |

The raw material mixture described above was further mixed with 25g of $NH_4Cl$ and 25g of $(NH_4)_2SO_4$ as fluxes and the resultant mixture was mixed well by means of a ball mill. The mixture obtained was placed in an alumina crucible and fired for 2 hours at 720° C in a nitrogen atmosphere containing 2% hydrogen. After firing, the fired product was washed with acetone, dried and sieved to provide the $BaF_2 \cdot BaCl_2 \cdot 0.5KCl \cdot 0.2BaSO_4:0.06Eu^{2+}$ (phosphor-II) having a mean grain size of 5.0μ and a standard deviation (logσ) of 0.40. The phosphor exhibited excellent emission characteristics as shown in Table 2 and Table 3 Also, the grains of the phosphor obtained were ballshaped as shown in FIG. 9, the specific surface area of the grains was 1.4m²/g, and thus the phosphor had suitable powder characteristics for a fluorescent layer.

EXAMPLE 4

| | |
|---|---|
| Barium fluoride ($BaF_2$) | 87.8 g |
| Strontium chloride ($SrCl_2 \cdot 6H_2O$) | 133.3 g |
| Potassium chloride (KCl) | 37.3 g |
| Strontium sulfate ($SrSO_4$) | 18.4 g |
| Europium chloride ($EuCl_3$) | 7.8 g |

The raw material mixture described above was mixed with 10g of $NH_4Cl$ as a flux and the resultant mixture was mixed well by means of a ball mill. The mixture thus obtained was placed in an alumina crucible and fired for one hour at 680° C in a nitrogen atmosphere containing 2% hydrogen. The fired product was crushed, placed again in an alumina crucible and fired for one hour at 720° C in an atmosphere having the same composition as above. After firing, the fired product was washed with acetone, dried and sieved to provide the $BaF_2 \cdot SrCl_2 \cdot KCl \cdot 0.2SrSO_4:0.06Eu^{2+}$ phosphor (phosphor-II) having a mean grain size of 5.0μ and a standard deviation (logσ) of 0.38. The phosphor exhibited excellent emission characteristics as shown in Table 2 and Table 3 under X-ray, ultraviolet ray and cathode ray excitation. Also, the grains of the phosphor were ball-shaped as shown in FIG. 9, the specific surface area of the grains was 1.3m²/g and thus the phosphor had suitable powder characteristics for a fluorescent layer.

EXAMPLE 5

| | |
|---|---|
| Barium fluoride ($BaF_2$) | 175.4 g |
| Barium chloride ($BaCl_2 \cdot 2H_2O$) | 244.2 g |
| Europium oxide ($Eu_2O_3$) | 7.04 g |
| Terbium oxide ($Tb_4O_7$) | 0.37 g |

The raw material mixture described above was further mixed with 20g of $NH_4Cl$ as a flux and the resultant mixture was mixed well by means of a ball mill. The mixture obtained was placed in a silica crucible and fired for 3 hours at 700° C in a nitrogen atmosphere containing 2% hydrogen. After firing, the fired product was washed with cold water (below 15° C), dried and sieved to provide the $BaF_2 \cdot BaCl_2:0.04Eu^{2+},0.002Tb^{3+}$ phosphor (phosphor-III) having a mean grain size of 5.0μ and a standard deviation (logσ) of 0.40. The phosphor exhibited highly efficient emission as shown in Table 2 under X-ray, ultraviolet ray and cathode ray excitation.

EXAMPLE 6

| | |
|---|---|
| Barium fluoride (BaF$_2$) | 87.7 g |
| Barium bromide (BaBr$_2 \cdot$ 2H$_2$O) | 166.6 g |
| Europium oxide (Eu$_2$O$_3$) | 3.52 g |
| Terbium oxide (Tb$_4$O$_7$) | 1.87 g |

The raw material mixture described above was further mixed with 13g of NH$_4$Br as a flux and the resultant mixture was mixed well by means of a ball mill. The mixture obtained was placed in a silica crucible and fired for 2 hours at 750° C in a nitrogen atmosphere containing 2% hydrogen. After firing, the fired product was washed with cold water (below 15° C), dried and sieved to provide the BaF$_2 \cdot$BaBr$_2$:0.04Eu$^{2+}$,0.02Tb$^{3+}$ phosphor (phosphor-III) having a mean grain size of 4.8μ and a standard deviation (logσ) of 0.45. The phosphor exhibited highly efficient emission as shown in Table 2 under X-ray, ultraviolet ray and cathode ray excitation.

EXAMPLE 7

| | |
|---|---|
| Barium fluoride (BaF$_2$) | 157.9 g |
| Magnesium fluoride (MgF$_2$) | 6.2 g |
| Barium chloride (BaCl$_2 \cdot$ 2H$_2$O) | 244.3 g |
| Europium oxide (Eu$_2$O$_3$) | 10.6 g |

The raw material mixture described above was further mixed with 20g of NH$_4$Cl as a flux and the resultant mixture was mixed well by means of a ball mill. The mixture obtained was placed in a silica crucible and fired for 2 hours at 750° C in a nitrogen atmosphere containing 2% hydrogen. After firing, the fired product was washed with cold water (below 15° C), dried and sieved to provide the (Ba$_{0.9}$,Mg$_{0.1}$) F$_2 \cdot$BaCl$_2$:0.06Eu$^{2+}$ phosphor (phosphor-IV) having a mean grain size of 5.0μ and a standard deviation (logσ) of 0.31. The phosphor exhibited highly efficient emission as shown in Table 2 under X-ray, ultraviolet ray and cathode ray excitation.

EXAMPLE 8

| | |
|---|---|
| Barium fluoride (BaF$_2$) | 83.3 g |
| Magnesium fluoride (MgF$_2$) | 1.56 g |
| Barium bromide (BaBr$_2 \cdot$ 2H$_2$O) | 166.7 g |
| Europium oxide (Eu$_2$O$_3$) | 5.3 g |

The raw material mixture described above was further mixed with 12g of NH$_4$Br as a flux and the resultant mixture was mixed well by means of a ball mill. The mixture thus obtained was placed in a silica crucible and fired for 3 hours at 780° C in a nitrogen atmosphere containing 2% hydrogen. After firing, the fired product was washed with cold water (below 15° C), dried and sieved to provide the (Ba$_{0.95}$,Mg$_{0.05}$)F$_2 \cdot$ BaBr$_2$:0.06Eu$^{2+}$ phosphor (phosphor-IV) having a mean grain size of 4.8μ and a standard deviation (logσ) of 0.35. The phosphor exhibited highly efficient emission as shown in Table 2 under X-ray, ultraviolet ray and cathode ray excitation.

EXAMPLE 9

| | |
|---|---|
| Barium fluoride (BaF$_2$) | 166.6 g |
| Magnesium fluoride (MgF$_2$) | 3.1 g |
| Barium chloride (BaCl$_2 \cdot$ 2H$_2$O) | 244.3 g |
| Potassium chloride (KCl) | 37.3 g |
| Europium oxide (Eu$_2$O$_3$) | 10.5 g |

The raw material mixture described above was further mixed with 20g of NH$_4$Cl as a flux and the resultant mixture was mixed well by means of a ball mill. The mixture obtained was placed in a silica crucible and fired for 3 hours at 720° C in a nitrogen atmosphere containing 2% hydrogen. After firing, the fired product was sufficiently washed with ethyl alcohol, dried and sieved to provide the (Ba$_{0.95}$,Mg$_{0.05}$)F$_2 \cdot$BaCl$_2 \cdot$0.5KCl:0.06Eu$^{2+}$ phosphor (phosphor-V) having a mean grain size of 5.0μ and a standard deviation (logσ) of 0.36. The phosphor exhibited excellent emission characteristics as shown in Table 2 and Table 3 under X-ray, ultraviolet ray and cathode ray excitation.

EXAMPLE 10

The raw material mixture of the composition described in Example 9 was fired under the same firing conditions as in Example 9. After firing, the fired product was washed once with cold water (below 15° C) at a rate of 1 liter per 200g. of the fired product, dried and sieved to provide the (Ba$_{0.95}$,Mg$_{0.05}$)F$_2 \cdot$BaCl$_2 \cdot$0.01KCl:0.06Eu$^{2+}$ phosphor (phosphor-V) having a mean grain size of 4.8μ and a standard deviation (logσ) of 0.38. The phosphor exhibited excellent emission characteristics as shown in Table 2 and Table 3 under X-ray, ultraviolet ray and cathode ray excitation.

EXAMPLE 11

| | |
|---|---|
| Barium fluoride (BaF$_2$) | 83.3 g |
| Magnesium fluoride (MgF$_2$) | 1.6 g |
| Barium bromide (BaBr$_2 \cdot$ 2H$_2$O) | 166.6 g |
| Potassium bromide (KBr) | 59.5 g |
| Europium oxide (Eu$_2$O$_3$) | 5.3 g |

The raw material mixture described above was further mixed with 15g of NH$_4$Br as a flux and the resultant mixture was mixed well by means of a ball mill. The mixture obtained was placed in a silica crucible and fired for 2 hours at 760° C in a nitrogen atmosphere containing 2% hydrogen. After firing, the fired product was sufficiently washed with ethyl alcohol, dried and sieved to provide the (Ba$_{0.95}$,Mg$_{0.05}$)F$_2 \cdot$BaBr$_{1.62}$·KBr:0.06Eu$^{2+}$ phosphor (phosphor-V) having a mean grain size of 5.2μ and a standard deviation (logσ) of 0.35. The phosphor exhibited excellent emission characteristics as shown in Table 2 and Table 3 under X-ray, ultraviolet ray and cathode ray excitation.

EXAMPLE 12

The raw material mixture of the composition described in Example 11 was fired under the same firing conditions as in Example 11. After firing, the fired product was washed once with cold water (below 15° C) at a rate of 1 liter per 200g of the fired product, dried and sieved to provide the (Ba$_{0.95}$,Mg$_{0.05}$)F$_2 \cdot$BaBr$_2 \cdot$0.03KBr:0.06Eu$^{2+}$ phosphor (phosphor-V) having a mean grain size of 5.0μ and a standard deviation (logσ) of 0.36. The phosphor exhibited excellent characteristics as shown in Table 2 and Table 3 under X-ray, ultraviolet ray and cathode ray excitation.

EXAMPLE 13

By mixing 8 parts by weight of the $BaF_2 \cdot BaCl_2 \cdot 0.05KCl:0.06Eu^{2+}$ phosphor (phosphor-I) prepared in Example 2 and 1 part by weight of nitrocellulose using a solvent mixture of acetone, ethyl acetate and butyl acetate of 1:1:8 by weight ratio, a dispersion of the phosphor having a viscosity of 50 centistokes was prepared. The dispersion was uniformly applied to a 0.25mm thick polyethylene terephthalate support having formed thereon a carbon black absorptive layer. The dispersion was applied with a knife coater at a rate of 50mg/cm$^2$ and dried at 50° C to form a phosphor layer. Then, an acrylic resin was further applied uniformly to the phosphor layer and dried to form a transparent protective layer 10$\mu$ in thickness. When the intensifying screen thus prepared was used in combination with a regular type X-ray film, the intensifying screen had a speed almost 6 times faster than that of the conventional high sharpness type CaWO$_4$ phosphor intensifying screen (the aforesaid FS) at an X-ray tube voltage of 80KVp and the afterglow characteristics thereof were almost the same as those of the aforesaid conventional intensifying screen. Also, the response functions (MTF values) of the intensifying screen at the spatial frequencies of 1.0 line/mm, 2.0 lines/mm and 3.0 lines/mm were 0.75, 0.45 and 0.31 respectively.

EXAMPLE 14

An intensifying screen was prepared by following the same procedure as in Example 13 using the $BaF_2 \cdot BaCl_2 \cdot 0.5KCl \cdot 0.2BaSO_4:0.06Eu^{2+}$ phosphor (phosphor-II) prepared in Example 3. When the intensifying screen thus obtained was used in combination with a regular type X-ray film, the intensifying screen had a speed almost 5.8 times higher than that of the conventional high sharpness type CaWO$_4$ phosphor intensifying screen (FS) at an X-ray tube voltage of 80KVp and had afterglow characteristics almost the same as those of the aforesaid conventional intensifying screen. Also, the response functions (MTF values) of the intensifying screen at the spatial frequencies of 1.0 line/mm, 2.0 lines/mm and 3.0 lines/mm were 0.76, 0.53 and 0.40 respectively.

EXAMPLE 15

An intensifying screen was prepared by following the same procedure as in Example 13 using the $BaF_2 \cdot SrCl_2 \cdot KCl \cdot 0.2SrSO_4:0.06Eu^{2+}$ phosphor (phosphor-II) prepared in Example 4. When the intensifying screen thus prepared was used in combination with a regular type X-ray photographic film, the intensifying screen had a speed almost 5 times higher than that of the conventional high sharpness type CaWO$_4$ phosphor intensifying screen (FS) at an X-ray tube voltage of 80KVp and had afterflow characteristics almost the same as those of the aforesaid conventional intensifying screen. Also, the response functions (MTF values) of the intensifying screen at the spatial frequencies of 1.0 line/mm, 2.0 lines/mm and 3.0 lines/mm were 0.77, 0.54 and 0.42 respectively.

EXAMPLE 16

An intensifying screen was prepared by following the same procedure as in Example 13 except that the $BaF_2 \cdot BaCl_2:0.04Eu^{2+}, 0.002Tb^{3+}$ phosphor (phosphor-III) prepared in Example 5 was used and the amount of the applied phosphor was 30 mg/cm$^2$. When the intensifying screen thus prepared was used in combination with a regular type X-ray film, the intensifying screen had a speed almost 4 times higher than that of the conventional high sharpness type CaWO$_4$ phosphor intensifying screen (FS) at an X-ray tube voltage of 80KVp. Also, the response functions (MTF values) of the intensifying screen at the spatial frequencies of 1.0 line/mm, 2.0 lines/mm and 3.0 lines/mm were 0.77, 0.48 and 0.34 respectively.

EXAMPLE 17

An intensifying screen was prepared by following the same procedure as in Example 13 except that the $(Ba_{0.9},Mg_{0.1})F_2 \cdot BaCl_2:0.06Eu^{2+}$ phosphor (phosphor-IV) prepared in Example 7 was used and the amount of the applied phosphor was about 30 mg/cm$^2$. When the intensifying screen thus prepared was used in the combination with a regular type X-ray film, the intensifying screen had a speed almost 4 times higher than that of the conventional high sharpness type CaWO$_4$ phosphor intensifying screen (FS) at an X-ray tube voltage of 80KVp. Also, the response functions (MTF values) of the intensifying screen at the spatial frequencies of 1.0 line/mm, 2.0 lines/mm and 3.0 lines/mm were 0.78, 0.53 and 0.40 respectively.

EXAMPLE 18

An intensifying screen was prepared by following the same procedure as in Example 13 except that the $(Ba_{0.95},Mg_{0.05})F_2 \cdot BaBr_2:0.06Eu^{2+}$ phosphor (phosphor-IV) prepared in Example 8 was used and the amount of the applied phosphor was 30 mg/cm$^2$. When the intensifying screen thus prepared was used in the combination with a regular type X-ray film, the intensifying screen had a speed almost 4.2 times higher than that of the conventional high sharpness type CaWO$_4$ phosphor intensifying screen (FS) at an X-ray tube voltage of 80KVp. Also, the response functions of the intensifying screen at the spatial frequencies of 1.0 line/mm, 2.0 lines/mm and 3.0 lines/mm were 0.79, 0.52 and 0.39 respectively.

EXAMPLE 19

An intensifying screen was prepared by following the same procedure as in Example 13 except that the $(Ba_{0.95},Mg_{0.05})F_2 \cdot BaCl_2 \cdot 0.01KCl:0.06Eu^{2+}$ phosphor (phosphor-V) prepared in Example 10 was used and the amount of the coated phosphor was 30 mg/cm$^2$. When the intensifying screen thus prepared was used in combination with a regular X-ray film at an X-ray tube voltage of 80KVp, the intensifying screen had a speed almost 4.3 times higher than that of the conventional high sharpness type CaWO$_4$ phosphor intensifying screen (FS) and had afterglow characteristics almost the same as those of the aforesaid conventional intensifying screen. Also, the response functions (MTF values) of the intensifying screen at the spatial frequencies of 1.0 line/mm, 2.0 lines/mm and 3.0 lines/mm were 0.77, 0.54 and 0.42 respectively.

We claim:

1. A complex halide phosphor represented by the composition formula

$$MeF_2 \cdot aMe'X_2 \cdot bKX' \cdot cMe''SO_4 : dEu^{2+}$$

wherein Me, Me' and Me" each represents at least one of the alkaline earth metals of the group consisting of barium, strontium and calcium; X and X' each represents at least one of chlorine and bromine; and a, b, c, and d are numbers defined as follows:

$$0.30 \leq a \leq 1.50, \; 0.10 \leq b \leq 2.00, \; 0.01 \leq c \leq 1.00,$$
$$0.001 \leq d \leq 0.20.$$

2. The complex halide phosphor as claimed in Claim 1 wherein said a, b, c and d are numbers meeting the condition of $0.80 \leq a \leq 1.20$, $0.20 \leq b \leq 1.20$, $0.05 \leq c \leq 0.40$ and $0.01 \leq d \leq 0.10$.

3. An X-ray image converter comprising a support and a fluorescent layer including a complex halide phosphor dispersed in a binder, the phosphor being represented by the composition formula

$$MeF_2 \cdot aMe'X_2 \cdot bKX' \cdot cMe''SO_4 : dEu^{2+}$$

wherein Me, Me' and Me" each represents at least one of the alkaline earth metals of the group consisting of barium, strontium and calcium; X and X' each represents at least one of chlorine and bromine; and a, b, c and d are numbers defined as follows:

$$0.30 \leq a \leq 1.50, \; 0.10 \leq b \leq 2.00, \; 0.01 \leq c \leq 1.00,$$
$$0.001 \leq d \leq 0.20.$$

4. The X-ray image converter as claimed in claim 3 wherein said X-ray image converter is an intensifying screen and the amount of phosphor in said flurescent layer is from 10 mg/cm² to 200 mg/cm².

5. The X-ray image converter as claimed in claim 4 wherein the amount of phosphor in said flurescent layer is from 20 mg/cm² to 150 mg/cm².

6. The X-ray image converter as claimed in claim 3 wherein said a, b, c and d are numbers meeting the condition of $0.80 \leq a \leq 1.20$, $0.20 \leq b \leq 1.20$, $0.05 \leq c \leq 0.40$ and $0.01 \leq d \leq 0.10$.

7. The X-ray image converter as claimed in claim 6 wherein the X-ray image converter is an intensifying screen and the amount of phosphor in said fluorescent layer is from 10 mg/cm² to 200 mg/cm².

8. The X-ray image converter as claimed in claim 7 wherein the amount of phosphor in the fluorescent layer is from 20 mg/cm² to 150 mg/cm².